US009229998B2

(12) United States Patent
Iyer et al.

(10) Patent No.: US 9,229,998 B2
(45) Date of Patent: *Jan. 5, 2016

(54) METHOD AND SYSTEM FOR EXCHANGING INFORMATION BETWEEN BACK-END AND FRONT-END SYSTEMS

(75) Inventors: Vaidyanathan Iyer, Tempe, AZ (US); Vikas Gupta, Naperville, IL (US)

(73) Assignee: AppsFreedom, Inc., Chandler, AZ (US)

( * ) Notice: Subject to any disclaimer, the term of this patent is extended or adjusted under 35 U.S.C. 154(b) by 231 days.

This patent is subject to a terminal disclaimer.

(21) Appl. No.: 13/100,974

(22) Filed: May 4, 2011

(65) Prior Publication Data

US 2011/0282969 A1 Nov. 17, 2011

Related U.S. Application Data

(60) Provisional application No. 61/334,235, filed on May 13, 2010.

(51) Int. Cl.
| | |
|---|---|
| *G06F 15/16* | (2006.01) |
| *G06F 17/30* | (2006.01) |
| *G06F 21/62* | (2013.01) |
| *G06F 9/54* | (2006.01) |

(52) U.S. Cl.
CPC .......... *G06F 17/30569* (2013.01); *G06F 9/541* (2013.01); *G06F 17/3056* (2013.01); *G06F 21/6227* (2013.01)

(58) Field of Classification Search
CPC .......... G06F 17/3056; G06F 17/30569; G06F 21/6227; G06F 9/541
See application file for complete search history.

(56) References Cited

U.S. PATENT DOCUMENTS

| 5,293,470 | A | * | 3/1994 | Birch et al. ................... 345/634 |
| 5,345,587 | A | * | 9/1994 | Fehskens et al. ............. 718/102 |
| 5,566,332 | A | * | 10/1996 | Adair et al. ............................ 1/1 |

(Continued)

FOREIGN PATENT DOCUMENTS

EP    1126674 A2 *   8/2001   ............. H04L 29/06

OTHER PUBLICATIONS

Agentry Platform Overview, Overview of Syclo Agentry Mobile Platform, downloaded from www.syclo.com/platform/platform_overview.php, Jun. 14, 2010.

*Primary Examiner* — Brian J Gillis
*Assistant Examiner* — Shean Tokuta
(74) *Attorney, Agent, or Firm* — Schmeiser, Olsen & Watts LLP

(57) ABSTRACT

A system for exchanging information content between a back-end system within a restricted access environment and an end-user includes a front-end system and a manager node outside of the restricted environment, and an access node within the restricted environment. The front-end system executes a mini-application to output query data. The manager node receives the query data and applies business logic and connection parameters to generate a request for the information content in a first format. The manager node communicates the request to the access node in the first format. The access node converts the request to a second format particular to the back-end system, and conveys the request to the back-end system. Responses containing the information content are received at the access node from the back-end system. The access node converts the responses to the first format and sends information content contained in the responses to the front-end system via the manager node.

29 Claims, 12 Drawing Sheets

(56) References Cited

U.S. PATENT DOCUMENTS

| | | | |
|---|---|---|---|
| 6,185,616 B1* | 2/2001 | Namma et al. | 709/227 |
| 7,373,389 B2* | 5/2008 | Rosenbaum et al. | 709/207 |
| 7,483,979 B1* | 1/2009 | Prager | 709/225 |
| 7,653,689 B1* | 1/2010 | Champagne et al. | 709/206 |
| 7,975,001 B1* | 7/2011 | Stefansson et al. | 709/203 |
| 8,180,845 B2* | 5/2012 | Brendle et al. | 709/217 |
| 2002/0099826 A1* | 7/2002 | Summers et al. | 709/227 |
| 2002/0180579 A1* | 12/2002 | Nagaoka et al. | 340/3.1 |
| 2002/0198983 A1* | 12/2002 | Ullmann et al. | 709/224 |
| 2003/0051059 A1* | 3/2003 | Zondervan et al. | 709/250 |
| 2004/0034521 A1* | 2/2004 | Kawakura et al. | 704/1 |
| 2004/0138956 A1* | 7/2004 | Main et al. | 705/22 |
| 2005/0108295 A1* | 5/2005 | Karimisetty et al. | 707/200 |
| 2005/0226430 A1* | 10/2005 | Kreifeldt et al. | 381/58 |
| 2005/0278345 A1* | 12/2005 | Andra et al. | 707/100 |
| 2006/0074793 A1* | 4/2006 | Hibbert et al. | 705/38 |
| 2006/0155529 A1* | 7/2006 | Ludviksson et al. | 704/4 |
| 2006/0178898 A1* | 8/2006 | Habibi | 705/1 |
| 2006/0242087 A1* | 10/2006 | Naehr et al. | 705/68 |
| 2007/0011156 A1* | 1/2007 | Maron | 707/6 |
| 2007/0300183 A1* | 12/2007 | Anttila et al. | 715/808 |
| 2008/0189706 A1* | 8/2008 | Abrink et al. | 718/101 |
| 2008/0249791 A1 | 10/2008 | Iyer | |
| 2008/0294791 A1* | 11/2008 | Karaoguz et al. | 709/231 |
| 2009/0049056 A1* | 2/2009 | Shutt et al. | 707/10 |
| 2009/0171702 A1* | 7/2009 | Foster et al. | 705/7 |
| 2009/0248842 A1* | 10/2009 | Hashimoto et al. | 709/221 |
| 2009/0300730 A1* | 12/2009 | Chaudhry et al. | 726/5 |
| 2009/0327730 A1* | 12/2009 | Deishi | 713/171 |
| 2010/0146401 A1* | 6/2010 | Fubioka | 715/747 |
| 2011/0145581 A1* | 6/2011 | Malhotra et al. | 713/171 |
| 2011/0197165 A1* | 8/2011 | Filippov et al. | 715/841 |
| 2011/0208663 A1* | 8/2011 | Kennis et al. | 705/317 |
| 2012/0054664 A1* | 3/2012 | Dougall et al. | 715/772 |
| 2012/0330917 A1* | 12/2012 | Wei et al. | 707/703 |

\* cited by examiner

```
BUSINESS LOGIC (FOR XML-BASED FORMAT)
<QUERY>
    SELECT                                          ─710
702     {OUTPUT_FIELD1}, {OUTPUT_FIELD2}
        SUM{{OUTPUT_FIELD1}, {OUTPUT_FIELD2}}
        SUBSTRACT {{OUTPUT_FIELD1}, {OUTPUT_FIELD2}}
704     COUNT{{OUTPUT_FIELD1}, {OUTPUT_FIELD2}}
        AVERAGE{{OUTPUT_FIELD1}, {OUTPUT_FIELD2}}
        MAX{{OUTPUT_FIELD1}, {OUTPUT_FIELD2}}
        MIN{{OUTPUT_FIELD1}, {OUTPUT_FIELD2}}
702 FROM
        SOURCE-APPLICATION_API
    WHERE              ─708              ─712
702     {CONDITION-1} AND {CONDITION-2}
        OR
   712  {CONDITION-1} AND {CONDITION-2}
        {COLUMN_NAME} BETWEEN {VALUE-1, VALUE-2}
        {COLUMN_NAME} IN {VALUE-1, VALUE-2}
        {COLUMN_NAME} = SELECT STATEMENT
    OPERATION
702     SELECT               712
        INSERT
        UPDATE
        DELETE
702 GROUPBY
        {OUTPUT_FIELD1}, {OUTPUT_FIELD2}
702 ORDERBY
        {OUTPUT_FIELD1}, {OUTPUT_FIELD2}
702 LIMIT
        {NUMBER}
702 UNION
        SELECT STATEMENT
702 CONDITION
        IF... THEN...ELSE
        CASE..WHEN..THEN
        LOOP... UNTIL
        WHILE...LOOP..ENDWHILE      706
        FOR...LOOP... ENDFOR
        EXCEPTIONS
</QUERY>
```

```
BUSINESS LOGIC (JSON-BASED FORMAT)
    "QUERY": {         902
         "SELECT": {
[ "OUTPUT_FIELD1", "OUTPUT_FIELD2"],
"SUM" ["OUTPUT_FIELD1", "OUTPUT_FIELD2"],
"SUBSTRACT" ["OUTPUT_FIELD1", "OUTPUT_FIELD2"],
"COUNT" ["OUTPUT_FIELD1", "OUTPUT_FIELD2"],        904
"AVERAGE" ["OUTPUT_FIELD1", "OUTPUT_FIELD2"],
"MAX" ["OUTPUT_FIELD1", "OUTPUT_FIELD2"],
"MIN" ["OUTPUT_FIELD1", "OUTPUT_FIELD2"],
         }
902  "FROM" : "SOURCE-APPLICATION API"    908
     "WHERE" : {
902         ["CONDITION_1", "AND", "CONDITION_2"]
            "OR"              908
            ["CONDITION_1", "AND", "CONDITION_2"]
            ["COLUMN_NAME", "BETWEEN", ["VALUE_1", "VALUE_2"]]
            ["COLUMN_NAME", "IN", ["VALUE_1", "VALUE_2"]]
            ["COLUMN_NAME": { "SELECT": {XXXXX}   } ]
     "OPERATION" : {"SELECT", "INSERT", "UPDATE", "DELETE"},
     "GROUPBY" : {"OUTPUT_FIELD1", "OUTPUT_FIELD2"},
     "ORDERBY": {"OUTPUT_FIELD1", "OUTPUT_FIELD2"},
     "LIMIT": "NUMBER",
     "UNION" : "SELECT {XXXXXX}"
     "CONDITION" : "IF" { }
902               "THEN" { }
                  "ELSE" { },
              "CASE" { }
                  "WHEN" { }
                  "THEN" { },
              "LOOP" { }
                  "UNTIL" { },         906
              "WHILE" { }
                  "LOOP" { },
              "FOR" { }
                  "LOOP" { },
902  "EXCEPTIONS" : { },
    }                                 // END-QUERY
```

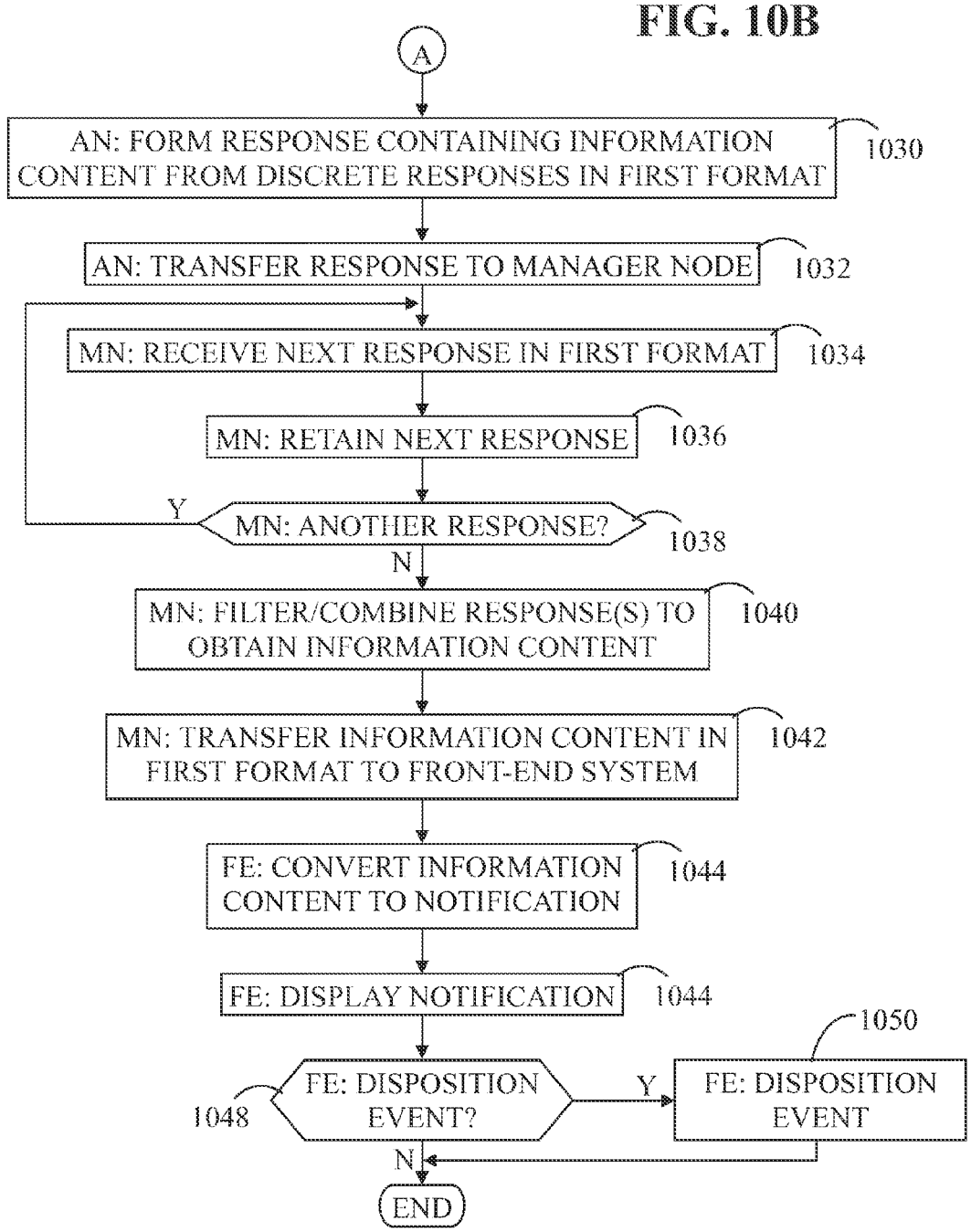

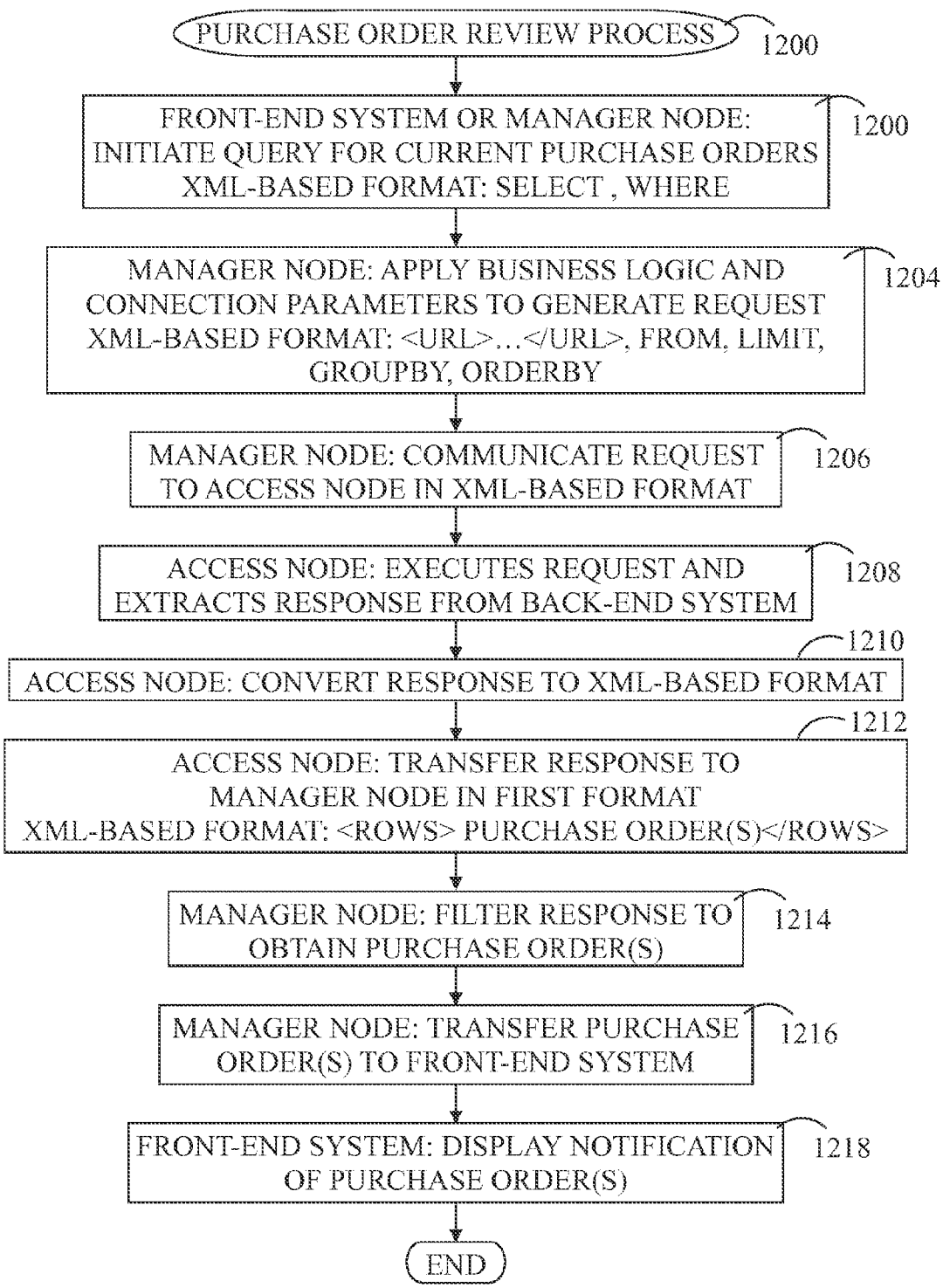

METHOD AND SYSTEM FOR EXCHANGING INFORMATION BETWEEN BACK-END AND FRONT-END SYSTEMS

RELATED INVENTIONS

The present invention claims priority under 35 U.S.C. §119 (e) to: "System and Method for Managing Micro Applications," U.S. Provisional Patent Application Ser. No. 61/334,235, filed 13 May 2010, which is incorporated by reference herein.

TECHNICAL FIELD OF THE INVENTION

The present invention relates to the field of enterprise systems and, more particularly, to a method and system for exchanging information between end-users and back-end enterprise systems.

BACKGROUND OF THE INVENTION

An enterprise system refers to the network of computers, interconnection equipment, and software components used within a business or organization to support the execution of business processes, information flows, reporting, data analysis, and so forth within and between organizations. A set of packaged application-software for an enterprise system can include, for example, enterprise resource planning (ERP), customer relationship management (CRM), supply chain management (SCM), strategic enterprise management (SEM), manufacturing integration and intelligence (MII), master data management (MDM), product lifecycle management (PLM), and so forth.

An enterprise system can additionally include all the data for manufacturing, supply chain management, financials, projects, human resources, etc., maintained in a common database. Through the common database, different business units can store and retrieve information. An enterprise system can be advantageous for a number of reasons, including standardization, lower maintenance, providing a common interface for accessing data, greater and more efficient reporting capabilities, sales and marketing purposes, and so forth.

Enterprise systems are typically back-end systems that support a company's back office. The "back office" is generally considered to be the technology, services, and human resources required to manage a company itself. Such back-end systems are typically contained within restricted access environments that require appropriate authentication and verification before a user can access such systems.

Unfortunately, access to enterprise systems can be complex and limited to certain users in an organization. For example, the use of an enterprise software system often requires a direct connection to the system. As such, use of these enterprise systems is typically limited to users with access to a desktop or a mobile workstation with disparate authorization and verification protocols. Furthermore, user interfaces (i.e., programs and hardware that control a display for the user and that allow the user to interact with the devices to these enterprise systems) can be difficult to implement and greatly varied among the various devices.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 7 shows a chart of business logic used to generate a request in the XML-based format;

FIG. 9 shows a chart of business logic used to generate a request in the JSON-based format;

FIGS. 10A and 10B show a flowchart of an information exchange process executed within the system of FIG. 1;

FIG. 12 shows a flowchart of an exemplary purchase order review process that may be implemented within the system of FIG. 1.

DETAILED DESCRIPTION OF THE PREFERRED EMBODIMENTS

Increasingly, users of enterprise systems wish to perform business processes from remote locations and using a variety of devices. These business processes can include, for example, order fulfillment and billing, workflow approval, proof of delivery, order capture, human capital management, customer sales and satisfaction, and even inventory and warehouse management. Typically, an organization stores business processes of an enterprise system on a number of different computing systems, which may be deployed on disparate platforms and disparate physical locations. Further, these computing systems may use different protocols, data structures, and databases, each system customized to cater to a specific business process within the organization.

The devices from which users may wish to perform business processes can include a myriad of mobile devices, operating systems, wired and wireless processor platforms using web browsers, and so forth. Furthermore, these devices call for various user interfaces, i.e., programs and hardware that control a display for the user and that allow the user to interact with the devices. Exemplary mobile devices include, for example, personal digital assistants (PDAs), tablet PCs, smart phones, and the like.

Embodiments of the invention entail methodology and a system for facilitating the exchange of information content between a back-end system contained in a restricted access environment and a front-end system. More particularly, embodiments of the invention facilitate the transfer of business data quickly and easily between multiple source enterprise applications of the back-end systems and various front-end systems.

Figure 1:
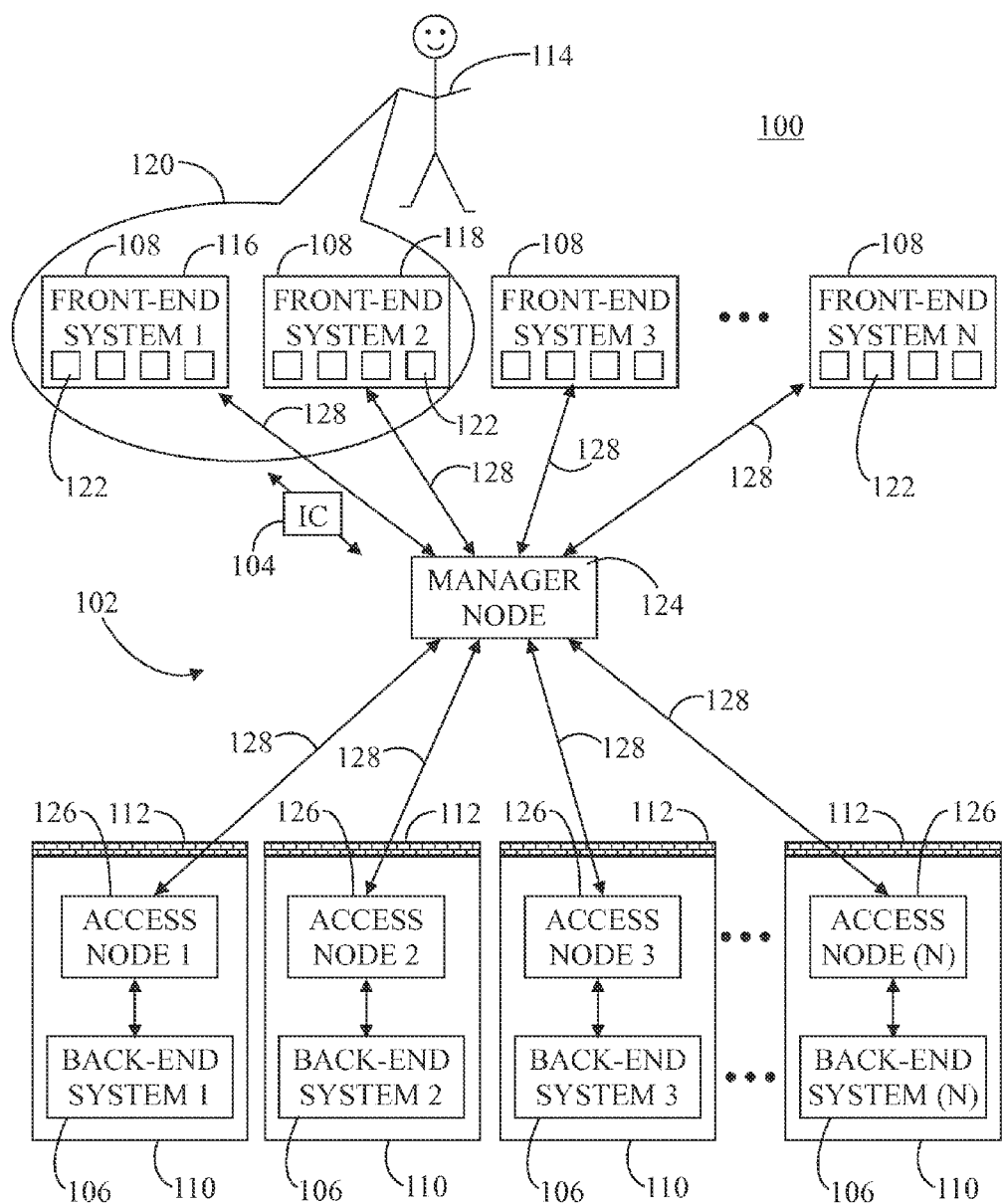
FIG. 1 shows a schematic diagram of a communication network that includes a system for exchanging information content between back-end systems and front-end systems.

Throughout this discussion, items are assigned three- or four-digit reference numbers whose first digit or first two digits reflects the Figure in which the item first appears. That is, items first appearing in FIG. 1 are assigned reference numbers between 100 and 199, items first appearing in FIG. 10 are assigned reference numbers between 1000 and 1099, etc. Once assigned, a given reference number is used in all Figures in which that item appears.

FIG. 1

FIG. 1 shows a schematic diagram of a communication network 100 that includes a system 102 for exchanging information content 104 (IC) between back-end systems 106 and front-end systems 108.

System 102 is implemented in network 100 for facilitating the exchange of information content 104 between back-end systems 106 and front-end systems 108, where each back-end system 106 is contained within a restricted access environment 110, and front-end systems 108 are located remotely outside of restricted access environment. Moreover, the exchange of information content 104 is effectively accomplished in minimal traversals over network 100 and enables real-time access to back-end systems 106.

In some embodiments, each back-end system 106 may be any computing device or devices implementing an enterprise system used within a business or organization to support the execution of business processes. For example, an organization may use several types of enterprise applications that make up its back-end system 106. These enterprise applications could include enterprise resource planning (ERP), supply chain management (SCM), customer relationship management (CRM), human resources (HR), and so forth. These enterprise applications may be supplied by a variety of vendors such as SAP, ORACLE, IBM, and so forth.

Network 100 includes a plurality of back-end systems 106 for illustrative purposes. One or more of these multiple back-end systems 106 in one or more locations may be utilized by a single organization to implement their enterprise system. In addition, or alternatively, distinct back-end systems 106 may be utilized by distinct organizations to implement their individual enterprise systems.

The term "restricted access environment" pertains to that portion of an organization's computing systems and processes that is blocked from unauthorized access while permitting authorized communication. This restricted access may be achieved through the implementation of a firewall 112 designed to prevent an unauthorized user from accessing the back-end system.

Front-end systems 108 encompass any of a variety of computing devices. For example, front-end systems 108 may be any variety of desktop computers executing web browsers, cellular phones, personal digital assistants (PDA), tablet PCs, smartphones, notebook computers, and so forth. Front-end systems 108 are used by end-users 114 to access back-end systems 106 from remote locations at any time convenient to end-users 114.

Network 100 includes a plurality of front-end systems 108 for illustrative purposes. One or more of these multiple front-end systems 108 may be utilized by a single end-user 114. In addition, distinct front-end systems 108 may be utilized by different end-users 114 to access their particular back-end systems 106.

In an exemplary scenario, end-user 114 may use one front-end system 108 such as a desktop computer 116, when he or she is located in an office. Alternatively, end-user 114 may use a different front-end system 108, such as a smartphone 118, when he or she is located outside of the office. A bubble 120 encircling desktop computer 116 and smartphone 118 indicates that these front-end systems 108 are associated with end-user 114, at least temporarily, for the purpose of accessing particular back-end systems 106.

In general, system 102 within network 100 includes at least one front-end system 108 directly accessible by end-user 114 and executing one or more mini-applications 122, a manager node 124 in communication with front-end system 108, and at least one access node 126 within each restricted access environment 110 in selective communication with each of manager node 124 and at least one back-end system 106. Front-end system 108, manager node 124, and access node 126 within system 102 may be periodically interconnected via a plurality of wired and/or wireless links 128.

Each of front-end systems 108 may run one or more mini-applications 122 to achieve the functionality of accessing particular back-end systems 106. Mini-applications 122 are light-weight applications (e.g., widgets, gadgets, etc.) that occupy a comparatively small amount of display space and system memory, do not include unused features, perform a specific and somewhat limited function, and execute quickly and efficiently. Mini-applications 122 provide secure access to back-end systems 106 via simple interfaces. In various embodiments, mini-applications 122 may be built and deployed on various platforms and operating systems. For example, some mini-applications 122 may be Google gadgets running under the Google Desktop framework, the Google Sites framework, the Google Documents framework, and/or the Google Maps framework. Other mini-applications 122 may be iPhone gadgets, Android gadgets, BlackBerry gadgets, and so forth.

Mini-applications 122 running under the Google Desktop framework may provide desktop alerts for business events at desktop computer 116. These desktop alerts can be information content 104 in the form of notifications of business events as non-intrusive pop-ups from back-end systems 106. Mini-applications 122 running under the Google Sites framework may provide visibility as well as small user interface displays for business interactions with back-end systems 106. Mini-applications 122 running under the Google Documents framework may provide a spreadsheet, Word-editor, or Powerpoint interface to back-end systems 106. Mini-applications 122 that are iPhone gadgets can provide access to business data contained in back-end systems 106 via the iPhone. Similarly, mini-applications 122 that are Android gadgets can provide access to business data contained in back-end systems 106 via Google phones, and mini-applications 122 that are BlackBerry gadgets can provide access to business data contained in back-end systems 106 via the Blackberry. In addition, mini-applications 122 may be built on various other platforms (e.g., social media platforms, Internet TV gadgets, and for forth) implemented in front-end systems 108.

Manager node 124 may be a multi-tenant cloud application that manages all communications between mini-applications executing on front-end system 108 and back-end systems 106 via access nodes 126. Cloud computing is Internet-based computing, whereby shared resources, software, and information are provided to computers and other devices on demand. A multi-tenant cloud application is an application that runs on a web server and can be used by multiple customers. However, each customer can customize the application to its user's purposes. Customizing an application includes adding new data fields, new data entities, new business logic, application flows, batch data manipulations, application screens and so forth, without the need to deploy a new application. Manager node 124 provides integration, security, usage, and data services between mini-applications 122 executing on front-end systems 108 and access nodes 126 within restricted access environments 110, as will be discussed in greater detail in connection with FIG. 3.

Access nodes 126 are applications that reside within a customer environment, i.e., behind associated firewalls 112 within restricted access environments 110, and are responsible for communications between manager node 124 and back-end systems 106. In the illustrated embodiment, each back-end system 106 within a restricted access environment 110 is associated with a single instance of an access node 126. It should be understood, however, that in alternative embodiments, a restricted access environment 110 may contain multiple back-end systems 106 and/or multiple access nodes 126 also contained within the same restricted access environment 110. Access nodes 126 will be discussed in greater detail in connection with FIG. 4.

Information content 104 may be notification from back-end system 106 of any conceivable event. In some embodiments, information content 104 may be a business event, process, or workflow. Information content 104 could be receipt of an order, shipment of an order, notification indicating that end-user 114 must approve a document such as an invoice, notification that a machine or plant has gone down, notifications of delays in shipment, notifications indicating whether a supplier will be able to meet his or her promised deliveries, and so forth. Although some examples of information content 104 are listed, it should be understood that information content 104 may be any information pertinent to the enterprise system of a particular organization.

As will be discussed in detail below, information content 104 is communicated between front-end systems 108 (executing mini-applications 122) and manager node 124 in a first standardized format. Likewise, information content 104 is communicated between manager node 124 and access node 126 in the first standardized format. However, information content 104 is communicated between access node 126 and back-end system 106 in a second format. This, second format is an application programming interface (API) that is application-specific to back-end system 106 with which access node 126 is associated. The API generally includes a set of functions, procedures, methods, classes, or protocols that an operating system, library, or service provides to support requests made by computer programs. Thus, access node 126 receives information content 104 from manager node 124 in the first format, converts it to application-specific API's for back-end system 106 in order to retrieve source content from back-end system 106. Access node 124 subsequently converts the source content received from back-end system 106 to the first format and sends it to front-end system 108 via manager node 124.

FIG. 2

Figure 2:
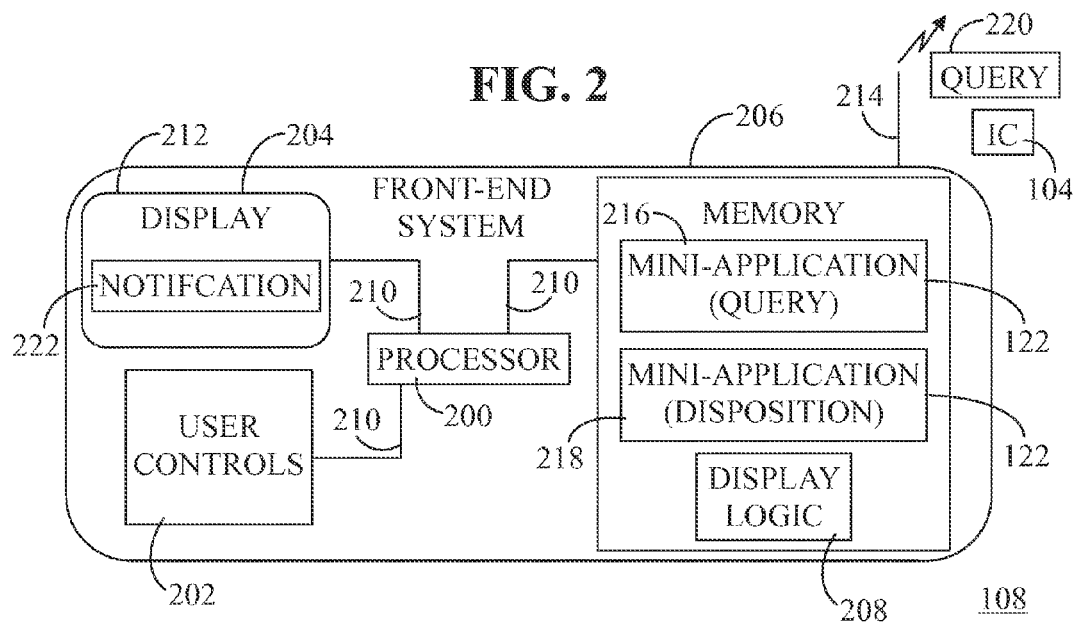
FIG. 2 shows a block diagram of one of the front-end systems within the network of FIG. 1.

FIG. 2 shows a block diagram of one of front-end systems 108 within network 100 that may be used to exchange information content with particular back-end systems 106. Again, front-end system 108 may encompass any of a variety of computing devices including desktop computers executing web browsers, cellular phones, personal digital assistants (PDA), tablet PCs, smartphones, notebook computers, and so forth.

Front-end system 108 includes a processor 200 on which methods according to the invention can be practiced. Processor 200 is in communication with an input device 202, an output device 204, and a memory system 206 for storing one or more mini-applications 122 and for storing display logic 208. These elements are interconnected by a bus structure 210.

Input device 202 can encompass user controls, such as a keyboard, touchscreen, keypad, mouse, pointing device, audio device (e.g., a microphone), and/or any other device providing input to processor 200. Output device 204 can encompass a display 212, a printer, an audio device (e.g., a speaker), and/or other devices providing output from processor 200. Input and output devices 202 and 204 can also include network connections, modems, or other devices, exemplified by an antenna 214, used for communications with other computer systems or devices, such as manager node 124 via network 100.

Memory system 206 may be a magnetic disk, compact disk, or any other volatile or non-volatile mass storage system readable by processor 200. Memory system 206 may also include cooperating or interconnected computer readable media, which exist exclusively on front-end system 108 or are distributed among multiple interconnected computer systems (not shown) that may be local or remote.

Mini-applications 122 are stored in memory system 206 for instructing processor 200 to query back-end system 106 about particular events and/or to disposition particular events. Front-end system 108 may run multiple mini-applications 122 stored in memory system 206 according to the preferences or business requirements of end-user 114. Each mini-application 122 is associated with one or more back-end systems 106, and only those mini-applications 122 in which end-user 114 has an interest need be executed. Front-end system 108 is not limited to only running mini-applications 122. In addition, front-end system 108 will typically be running multiple applications concurrently.

For clarity of description, mini-applications 122 stored in memory system 206 include a query mini-application 216 and a disposition mini-application 218. In an example, end-user 114 may wish to be kept informed of certain business events, and subsequently respond to, or disposition, those business events. In an embodiment, query mini-application 216 may periodically execute in order to send query data 220 to back-end system 106. Alternatively, execution of query mini-application 216 may be initiated by end-user 114 via input device 202. In response, information content 104 may be received at front-end system 108 for presentation as a notification 222, for example, a pop-up message, on display 212. Disposition mini-application 218 may subsequently execute in order to allow end-user to disposition the event indicated by notification 222.

In an exemplary scenario, when end-user 114 is an employee of a company, he or she may wish to be informed of particular business events. For example, a manager may wish to receive notice of open purchase orders. Accordingly, query mini-application 216 may periodically execute in order to access purchase order information from a particular one of back-end systems 106. This purchase order information may then be provided from back-end system 106 as notification 222 of particular open purchase orders. End-user 114 may subsequently initiate execution of disposition mini-application 218 in order to disposition the purchase orders, for example, send an approval or disapproval indication of a particular purchase order to back-end system 106 in order to update particular information content 104 at back-end system 106.

Only one simplified example is mentioned above for brevity. However, it should be understood that a multitude of mini-applications 122 can be provided that enable end-user 114 to query back-end systems 106, to update information content 104 at back-end systems 106, to monitor the status of information content 104 at back-end system 106, and so forth in accordance with particular enterprise systems of a particular organization or business. Moreover, in alternative embodiments, one of mini-applications 122 may include the appropriate command structure to both query back-end system 106 and disposition, i.e., update, information content 104 at back-end system 106.

FIG. 3

Figure 3:
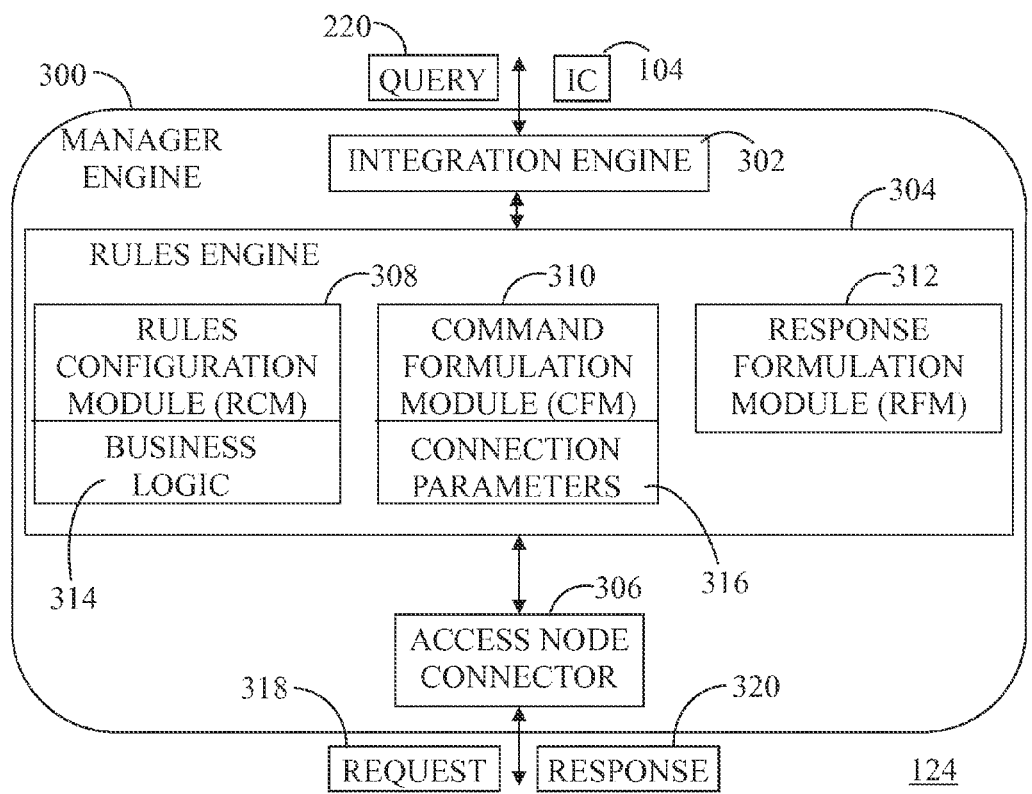
FIG. 3 shows a block diagram of a manager node of the system of FIG. 1.

FIG. 3 shows a block diagram of manager node 124 of system 102. Manager node 124 is used within network 100 to enable an exchange of information content 104 between front-end systems 108 and the appropriate back-end systems 106. Again, manager node 124 may be a multi-tenant cloud application executable on one or more processor systems. That is, manager node 124 may be a central application hosted by a cloud provider and delivered as a software-as-a-service (SaaS) application. Generally, the multi-tenant cloud application manages communications between mini-applications 122 executing on front-end systems 106 and back-end systems 106 via access nodes 126.

Various functions of manager node 124 may be provided by a third party cloud provider. These various functions may include administrative console; customer onboarding (i.e., acquiring and keeping customers); development framework/tools/API; workflow and usage monitoring; subscription management, bundling, pricing, & reports; user authentication and internationalization; trial-ware management and release management; multi-tenancy, database flexibility, and database isolation; and so forth. These various functions are not described in detail herein for brevity.

The inventive core of manager node 124 is a manager engine 300. Manager engine 300 acts as the central execution engine between front-end systems 108 executing mini-applications 122 and access nodes 126. In an embodiment, manager engine 300 includes an integration engine 302, a rules engine 304, and an access node connector 306. The term "engine" used herein refers to some combination of hardware and/or software that performs a very specific and repetitive function. The term "connector" used herein does not necessarily refer to a physical device that connects manager node 124 with an external entity. Rather, the term "connector" refers to some combination of hardware and/or software that enables communication between manager node 124 and appropriate access nodes 126.

Integration engine 302 is responsible for handling all external communications with respect to mini-applications 122 executing on front-end systems 108, and for handling various validations before passing any external communications further on for processing. For example, front-end system 108 may send query data 220 in a first standardized format (discussed below) as a secure web-service for receipt at integration engine 302 of manager node 124. Integration engine 302 could then validate and verify end-user 114 sending query data 220 and forward query data 220 to rules engine 304, again in the first standardized format.

Rules engine 304 is responsible for applying rules to query data 220 incoming from front-end system 108, manipulating query data 220 appropriately, and forwarding query data 220 in the first standardized format to access node connector 306. Rules engine 304 includes a rules configuration module 308, a command formulation module 310, and a response formulation module 312. The term "module" used herein refers to a program unit that is discrete and identifiable with respect to compiling, combining with other modules, and loading.

Rules configuration module 308 accepts query data 220 from integration engine 302 in the first standardized format and appends query data 220 with business logic 314 that is appropriate for both mini-application 122 sending query data 220 and to the appropriate back-end systems 106. In other words, business logic 314 specifies the type of information content 104 to be sent to front-end system 108. Rules configuration module 308 forwards query data 220 appended with business logic 314 in the first standardized format to command formulation module 310.

Command formulation module 310 accepts query data 220 appended with business logic 314 from rules configuration module 306 and applies the technical rules and logic that is appropriate for both mini-application 122 sending query data 220 and to the appropriate back-end systems 106. For example, command formulation module 310 may apply connection parameters 316, such as a network address, to query data 220 that identify a particular one of access nodes 126 to be queried. Thus, command formulation module 310 completes the generation of a request 318 in the first standardized format (discussed below) with respect to query and data selection. Command formulation module 310 subsequently forwards request 318 to access node connector 306.

Access node connector 306 takes request 318 in the first standardized format from command formulation module 310 and securely communicates request 318 to one of access nodes 126 identified by connection parameters 316 in request 318. Some functions that may be performed by access node connector 306 include locating the appropriate access node 126 for an associated back-end system 106, encrypting and securing request 318 for transmission, and communicating request 318 to the appropriate access node 126.

In addition, access node connector 306 is enabled to receive a response 320 from access node 126 in the first standardized format. In general, response 320 represents the particular information content 104 (e.g., business events) requested from one or more back-end systems 106 during the execution of one of mini-applications 122, such as query mini-application 216. Upon receipt of response 320, access node connector 306 forwards response 320 to response formulation module 312.

Response formulation module 312 processes response 320 from back-end system 106 by applying appropriate business rules. Some of the typical functions of response formulation module 312 include, for example, filtering response 320 coming from access node connector 306 to obtain information content 104 requested upon execution of one of mini-applications 122, such as query mini-application 216.

In an embodiment, one of mini-applications 122 may output query data 220 that calls for accessing two or more back-end systems 106 in order to formulate information content 104. In such an instance, response formulation module 312 may temporarily store a subset of the requested information content 104 while access node connector 306 is processing other routines in order to receive responses 320 from other back-end systems. Response formulation module 312 may then receive these additional responses 320, filter them to obtain additional subsets of information content 104, and eventually compile the subsets of information into a single packet of information content 104.

This information content 104 is forwarded from response formulation module 312 to integration engine 302 where it is sent to the particular one of front-end systems 108 executing one of mini-applications 122. In some instances, display logic 208 may additionally be communicated with information content 104 so that notification 222 of information content 104 can be appropriately displayed on the receiving front-end system 108.

Manager node 124 may additionally include a data logger module and/or an error handler module The data logger module may log all application messages and store milestone data from manager engine 300 with an appropriate audit trail. The error handler module handles error resolutions.

FIG. 4

Figure 4:
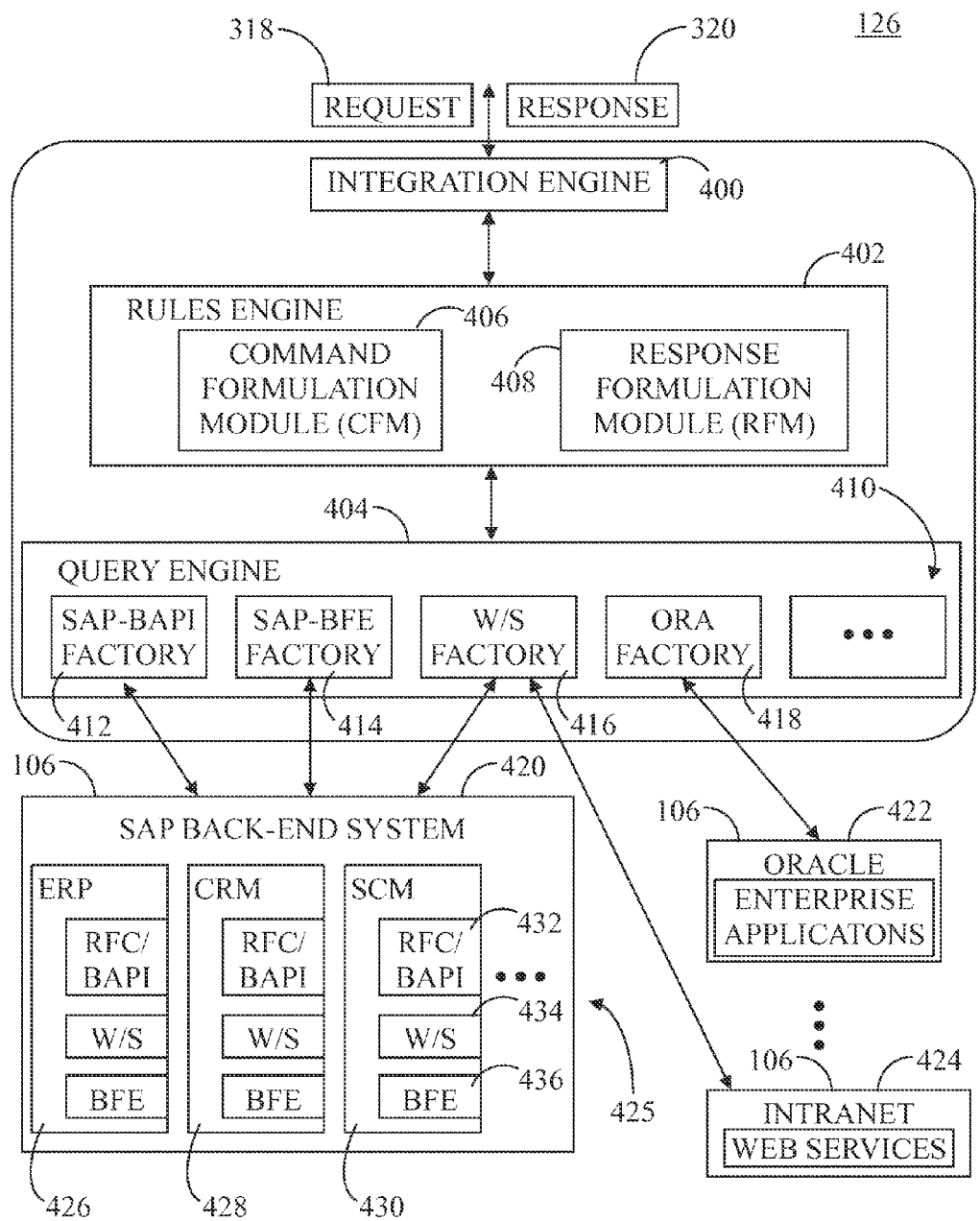
FIG. 4 shows a schematic diagram of an access node of the system of FIG. 1.

FIG. 4 shows a block diagram of one of access nodes 126 of system 102. Access node 126 is used within network 100 to connect its associated back-end system 106 to manager node 124. In other words, access node 126 receives requests 318 from manager node 124 and sends responses 320 to manager node 124. Access node 126 is hosted within an organization's firewall 112. Access node 126 includes an integration engine 400, a rules engine 402, and a query engine 404.

Integration engine 400 is responsible for handling external communications with manager node 124. Request 318 is received at integration engine 400 from manager node 124 in the first standardized format. Request 318 includes business logic 314, is desirably comprehensive, and contains all the information for processing, as well as any data. Integration engine 400 validates and verifies request 318 and sends it to rules engine 402.

Rules engine 402 is responsible for applying rules to the incoming request 318, manipulating request 318, and sending request 318 to query engine 404. Rules engine 402 includes a command formulation module 406 and a response formulation module 408.

In general, command formulation module 406 of rules engine 402 receives request 318 and separates it into smaller steps, or discrete operations, for execution in accordance with a source application executing on a particular one of back-end systems 106. Command formulation module 406 passes these smaller steps or operations separated from request 318 to query engine 404 along with system parameters for the associated back-end system 106.

Query engine 404 is responsible for taking the smaller steps, pieces, or operations separated from request 318 in the first standardized format and executing the Application Programming Interface (API) in particular source back-end systems 106. Query engine 404 has factories 410, or factory objects, for each source application, i.e., back-end system 106, supported. The term "factory" refers to an object, in object-oriented computer programming, for creating other objects. In this instance, each "factory" processes request 318 received in the first standardized format to create API objects specific to a source application of a particular back-end system 106. Thus, at each of factories 410, request 318 (i.e., the smaller steps, pieces, or operations of request 318) in the first standardized format is converted into a second format, the second format being API objects specific to a source application of a particular back-end system 106.

In an embodiment, factories 410 may include, but are not limited to, one or more of an SAP business application programming interface (BAPI) factory 412, an SAP business function enabler (BFE) factory 414, a Web Services factory 416, Oracle factory 418, and so forth. Factories 410 generally provide for the conversion of request 318 from the first standardized format to a particular format suitable to particular source back-end systems 106. In an example, back-end systems 106 in the form of an SAP back-end system 420, an Oracle back-end system 422, and intranet web services back-end system 424 are illustrated.

SAP is a software company which specializes in the development of business enterprise software. SAP back-end system 420 includes source applications referred to herein as back-end applications 425. By way of example, back-end applications 425 include an enterprise resource planning (ERP) application 426, a customer relationship management (CRM) application 428, and a supply chain management (SCM) application 430. Ellipses indicate that SAP back-end system 420 may include additional back-end applications 425 not illustrated for brevity. Each of ERP application 426, CRM application 428, and SCM application 430 may communicate using a remote function call (RFC) interface and/or a business application programming interface (BAPI). The RFC interface and the BAPI interface are illustrated herein as a single RFC/BAPI interface 432. Each of ERP application 426, CRM application 428, and SCM application 430 may additionally communicate using a web services (W/S) interface 434 and/or a business function enabler (BFE) interface 436.

A remote function call is the standard SAP interface for communication between an SAP client, e.g., end-user 114, and an SAP server, e.g., SAP back-end system 420 over transmission control protocol/internet protocol (TCP/IP) or common programming interface for communications (CPI-C) connections. A BAPI is a remote-enabled function module provided by SAP and used to achieve business related functionalities. BAPIs enable access to SAP functions across formal, stable and dialog-free interfaces. These interfaces can be used by external applications developed by customers and complementary software partners as well as by other SAP applications. BAPIs are defined as application programming interface (API) methods of SAP Business Object Types. These object types are used within the Business Framework to enable object-based communication between components.

SAP BAPI factory 412 calls SAP Remote Function modules from request 318 that was received from rules engine 402 in the first standardized format. In particular, SAP BAPI factory 412 converts request 318 from the first standardized format into a second format, namely an SAP language format, and conveys request 318 in the SAP language to a particular SAP RFC/BAPI interface 432 for any of, for example, ERP application 426, CRM application 428, SCM applications 430. SAP BAPI factory 412 subsequently receives response 320 in the SAP language format, extracts the data in response 320, formulates response 320 back into the first standardized format, and sends it to response formulation module 408 of rules engine 402.

The SAP business function enabler interface 436 is a module that resides within SAP and communicates with access node 126 on one side and executes SAP function modules on the other side. A large number of SAP function modules and data within various SAP applications are not exposed outside of restricted access environment 110 for external program calls from end-user 114. Indeed, roughly only forty percent of the data within SAP applications may be exposed via RFC/BAPI interface 432 and W/S interface 434. The remaining sixty percent of the data within SAP applications is non-remote enabled data. In other words, an user can only access this information from within the restricted access environment 110 via BFE interface 436. Business function enabler interface 436 enables a standardized way of exposing any data within an SAP application.

Accordingly, SAP BFE factory 414 converts request 318 from the first standardized format into a second format, namely an SAP specific query in SAP's proprietary protocol and format. SAP BFE factory 414 subsequently conveys request 318 in SAP's proprietary format to a particular SAP BFE interface 436. SAP BFE factory 414 subsequently receives response 320 in the SAP proprietary format, extracts the data in response 320, formulates response 320 back into the first standardized format, and sends it to response formulation module 408 of rules engine 402.

Web services factory 416 converts request 318 from the first standardized format to call web services and extract data from intranet web services back-end system 424 or any of SAP web services interfaces 434. Web services factory 416 subsequently formulates response 320 back into the first standardized format and sends response 320 back to response formulation module 408 of rules engine 402. Oracle factory 418 receives request 318 in the first standardized format from rules engine 402 and converts request 318 into Oracle specific queries in order to extract data from Oracle back-end system 42. Oracle factory 418 subsequently receives response 320, formulates it back into the first standardized format and sends response 320 back to response formulation module 408 of rules engine 402.

Response formulation module 408 of rules engine 402 is used to process response 320 from query engine 404 back to manager node 124. Some typical functions of response formulation module 408 include, for example, filtering response 320 coming from query engine 404 and holding information content 104 contained in response 320 while query engine 404 may be processing other routines. The information content contained in multiple responses may eventually be compiled to form a single response 320 that is communicated in a single traversal via link 128 to manager node 124.

FIG. 5

Figure 5:
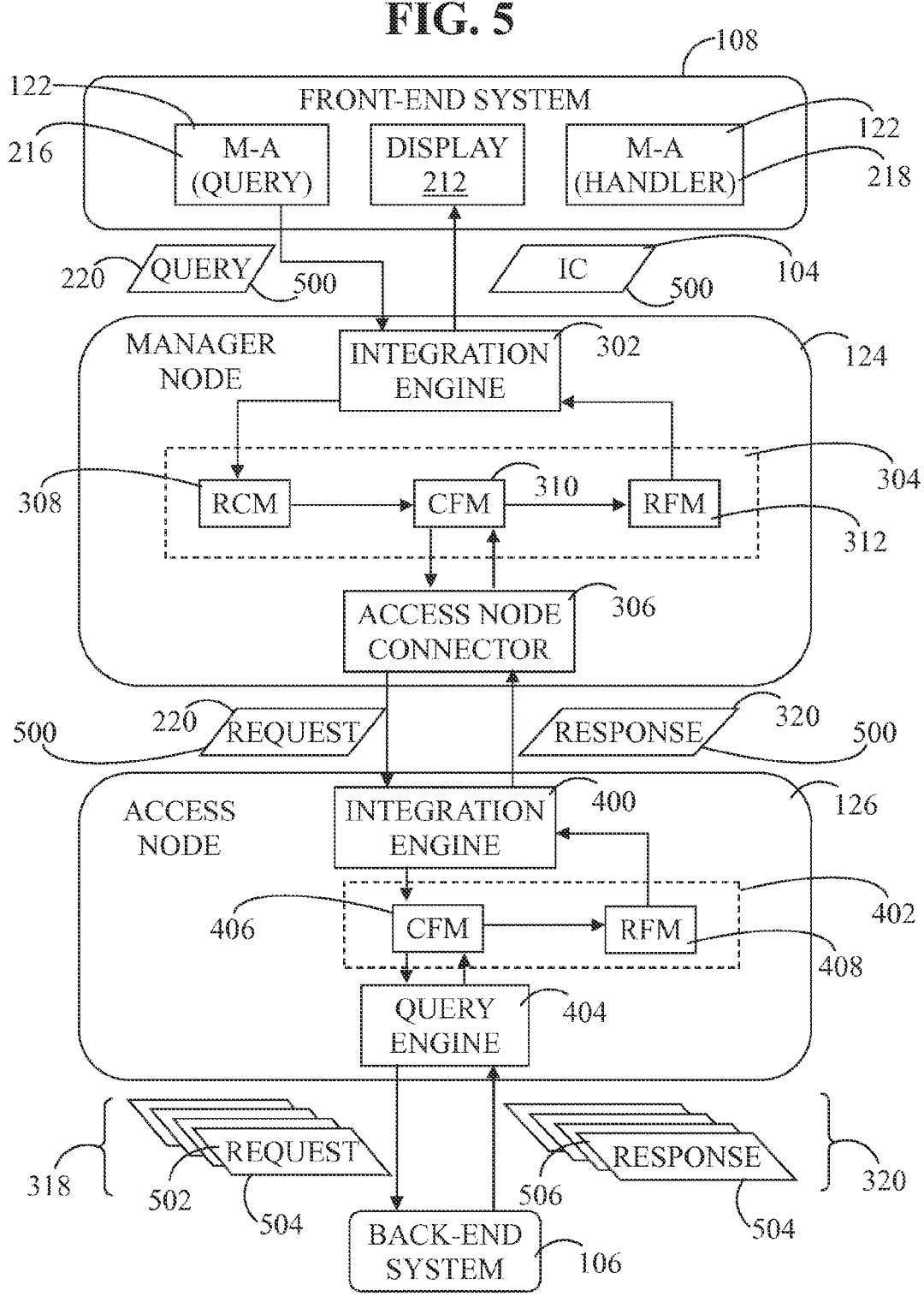
FIG. 5 shows a network diagram summarizing communication flow between the various elements of the system of FIG. 1.

FIG. 5 shows a network diagram summarizing communication flow between the various elements of system 102 within network 100.

In an exemplary scenario, front-end system 108 executes one of its mini-applications 122, and in this case, query mini-application 216. Execution of query mini-application 216 may occur through input by end-user 114 or mini-application 216 may be configured to automatically execute at periodic intervals. Query mini-application 216 formulates query data 220 in a standardized format and subsequently outputs query data 220 to manager node 124 in a first transmission event via links 128. For illustrative purposes, the standardized format for communications is represented by a rightward leaning parallelogram 500.

Query data 220 in standardized format 500 is received at integration engine 302 of manager node 124. Integration engine 302 validates query data 220 and forwards query data 220 to rules configuration module (RCM) 308 of rules engine 304. Rules configuration module 304 applies business logic 314 to query data 220 and forwards query data 220 with business logic 314 to command formulation module (CFM) 310 in standardized format 500.

Command formulation module 310 receives query data 220 with the applied business logic 314 and applies connection parameters 316 in order to generate request 318 for information content 104 in standardized format 500. In alternative embodiments, command formulation module 310 may initially break query data 220 with the applied business logic 314 into smaller subsets in the instance that information content 104 is to be obtained from more than one back-end system 106. Once query data 220 is subdivided, connection parameters 316 are applied to the subdivided query data 220 in order to generate multiple requests 318. In either instance, after request 318 is generated in standardized format 500, command formulation module 310 sends request 318 to access node connector 306 in a second transmission event via links 128.

Access node connector 306 receives request 318, identifies one of access nodes 126 and securely sends request 318 to integration engine 400 of access node 126 in standardized format 500. Integration engine 400 receives request 318 in standardized format 500, processes request 318, and forwards request 318 to command formulation module 406 of access node 126.

Command formulation module 406 breaks request 318 into smaller request queries, referred to herein as discrete operations 502, in accordance with an API to be used to access back-end applications 425 (e.g., ERP application 426, CRM application 428, SCM application 430, etc.) within back-end system 106. Command formulation module 406 calls query engine 404 with a single operation 502 in standardized format 500.

Query engine 404 receives the single operation 502 and converts operation 502 from standardized format 500 to a different format particular to the access interface (e.g., RFC/BAPI interface 432, W/S interface 434, BFE interface 436, etc.) being used at back-end system 106. This application programming interface (API) format is represented by a leftward leaning parallelogram 504. Query engine 404 subsequently conveys operation 502 in API format 504 to back-end system 106, and more particularly, to the one of back-end applications 425 to which operation 502 is directed.

Query engine 404 receives a discrete response 506 from back-end system 106 in API format 504 and sends response 506 to command formulation module 406. Command formulation module 406 controls further calls to query engine 404 in accordance with the multiple discrete operations 502. Response 506 may be stored at response formulation module 402 until all calls of operations 502 are made to back-end system 106, and all responses 506 are received.

Once all calls are made, response formulation module 408 processes, compiles, or otherwise manipulates the multiple responses 506 to preferably form a single communication packet containing response 320 in standardized format 500. Response 320 is then sent to integration engine 400. Integration engine 400 securely sends response 320 to access node connector 306 of manager node 124 in a third transmission event via links 128.

Response 320 formed at response formulation module 408 is preferably a "lean" message containing the requested information content 104. The term "lean" used here refers to a message that is compact, small in size, and contains only the necessary information so that response 320 can be quickly and efficiently sent via link 128 from access node 126 to manager node 124 in a single communication traversal.

When access node connector 306 receives response 320, it sends response 320 in standardized format 500 to command formulation module 310. Command formulation module 310 controls further calls to other access nodes 126 and back-end systems 106 as needed. One or more responses 320 in standardized format 500 are stored in response formulation module 312 of manager node 124 until all requests 318 in standardized format 500 are completed.

When all requests 318 are completed, response formulation module 312 processes, compiles, or otherwise manipulates the multiple responses 320 to preferably form a single communication packet containing information content 104 in standardized format 500. Information content 104 is then sent to integration engine 302. Integration engine 302 securely sends information content 104 from manager node 124 to front-end system 108 in a fourth transmission event via links 128.

At front-end system 108, information content 104 may be presented on display 212 as notification 222. Advantageously, notification 222 may be displayed in a format that is optimized for the particular front-end system 108 on which it is displayed.

Thus, the configuration of elements in system 102 provides for the secure, efficient, and timely delivery of information content 104 from back-end system 106 to front-end system 108. Preferably communication via network 100 is accomplished in minimal traversals over links 128.

FIG. 6

Figure 6:
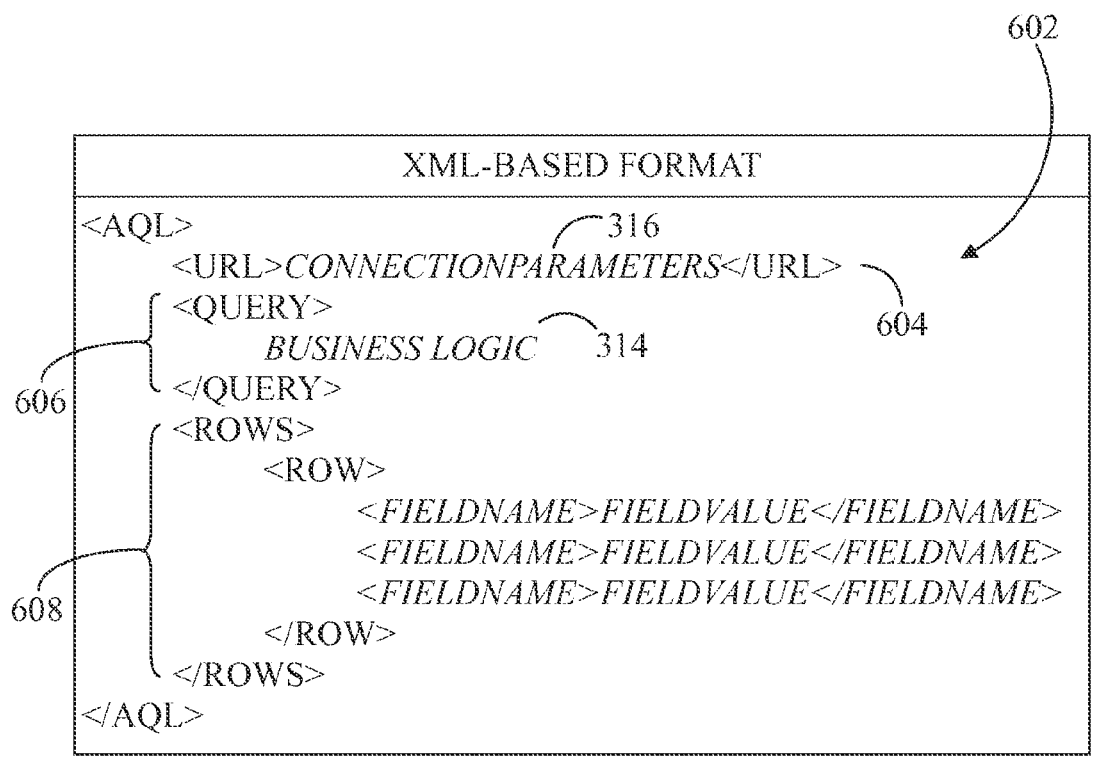
FIG. 6 shows a chart of an XML-based format used to generate and communicate data within the system of FIG. 1.

FIG. 6 shows a chart 600 of an XML-based format 602 used to generate and communicate requests 318 and responses 320 between front-end system 108, manager node 124, and access node 126. XML-based format 602 is one of multiple standardized formats 500 that may be implemented within system 102. A JSON-based format 802 will also be discussed in connection with FIGS. 8 and 9.

There are a multitude of user interfaces across the multitude of front-end systems 108 used in businesses today, including desktop clients, Web-services, smartphones, etc. User interfaces include hardware (physical) and software (logical) components. User interfaces allow users to input in order to manipulate a system and allow the system to indicate the effects of the users' manipulation. Business users, i.e., end-users 114, may use many of these types of user interfaces and front-end systems 108 in his or her average work day, from accessing back-end systems 106 via desktop-client or via web-browsers or even accessing business emails via mobile phones. In addition, an organization may use many types of back-end applications 425, such as enterprise resource planning application 426, customer relationship management application 428, supply chain management 430, human resources applications, and the like provided by various vendors. In addition, there are a variety of Software-as-a-Source (SaaS) vendors that provide cloud applications. One problem is how to readily enable communication between the multitude of front-end systems 108 that implement a variety of user interfaces with various back-end systems 106 in a manner that is scalable simple, and readily understood.

Each of XML-based and JSON-based formats 602 and 802 solves this problem for mini-applications 122 where a small amount of business data needs to be transferred very quickly and easily between multiple back-end applications 425 at back-end systems 106 and various front-end systems 108. Each of XML-based and JSON-based formats 602 and 802 is a novel query language that enables any of a multitude of front-end systems 108 outside of restricted access environments 110 to communicate with any of a multitude of back-end systems 106 located within restricted access environments 110. In addition, each of XML-based and JSON-based formats 602 and 802 is built for simplicity so that an individual can readily write a query to extract information content 104 from any back-end system 106 without needing to know the proprietary language of various enterprise back-end applications 425 (e.g., SAP applications, Oracle applications, IBM applications, and so forth) or the intricate details of back-end systems 106.

Each of XML-based and JSON-based formats 602 and 802 provides a normalized and common format between various back-end systems 106 and front-end systems 108 in desktop computers, browsers, and mobile devices. Additionally, each of XML-based and JSON-based formats 602 and 802 enables communication using minimal characters in order to keep transmission messages small in size. This feature is particularly useful in mobile phone communications where successful communication depends on the quality of signals.

Each of XML-based and JSON-based formats 602 and 802 is "self-contained" in terms of 1) retaining business knowledge to not only extract the correct data from various back-end systems 106 but apply business logic 314 and simple mathematical rules, 2) containing the technical knowledge to know where to send requests 318 and using which connection parameters 316, 3) encompassing technical and business knowledge in one place so that other systems understand XML-based and/or JSON-based formats 602 and/or 802, and 4) encompassing responses from various back-end systems 106 into a common and compact format for various user interfaces across various front-end systems 108 in order to understand and display the notifications.

XML-based format 602 combines the features of extensible markup language (XML) with structured query language (SQL). As is well known, XML is a set of rules for encoding documents in machine-readable form. XML emphasizes simplicity, generality, and usability over the Internet. SQL on the other hand is an industry-standard language for creating, updating, and querying relational database management systems.

A conventional XML-based language format is typically used for long-distance or Internet communications. It is also typically used for transmitting data with medium to large record sets. However, a conventional XML-based language format cannot extract business data from an enterprise system, e.g., back-end system 425, let alone a disparate set of enterprise systems with different formats and syntax. In contrast, a conventional SQL-based language format is useful for system interactions around business data. That is, it is typically used for business data extractions and/or updates into business systems and/or databases. However, a conventional SQL-based language format is not built for long distance communication, especially across the Internet and across disparate enterprise systems. In particular, it lacks the ability to handle communication data and protocols required for data communications over the Internet.

XML-based format 602 allows long-distance data communication across the Internet between disparate systems. In addition, XML-based format 602 allows business communication for data extractions and data updates to and from disparate enterprise systems.

As illustrated in chart 600, the general structure of XML-based format 602 roughly follows an XML standard. For example, elements within XML-based format 602 are written with a start tag and an end tag, with the content in between. Typically tags are composed of the name of the element surrounded by angle brackets, e.g., "<AQL>". In addition, all tags should have a beginning tag with parentheses "< >" and end with an ending tag with a forward slash within parentheses "</>," e.g. "</AQL>." The term "AQL" refers to API (application programming interface) Query Language. "AQL" is the generalized nomenclature used herein for XML-based format 602 and JSON-based format 802 for querying back-end applications 425. AQL is desirably a reserved word that is not used elsewhere.

<AQL>message</AQL> defines the message structure of XML-based format 602, the contents of which will be generated by input from one of mini-applications 122 as well as from manager node 124.

A URL tag 604, <URL>connectionparameters</URL>, provides connection parameters 316 for one of back-end systems 106, such as SAP, Oracle, Infor, and also includes web services and cloud applications, databases, and so forth. "<URL>" signifies the start of the value and "</URL>" signifies the end of the value. Desirably, "URL" is a reserve word that should not be used elsewhere. The various tags, format and permissible values for connection parameters include, for example:

Protocol://hostname:port/contextname?parametername=parametervalue
where:
"://" "?" and "=" are syntax elements in the communication parameters "Protocol" refers to the various permissible values for protocol. These permissible values include 1) http: to connect to application using the HTTP protocol; 2) https: to connect to applications using HTTPS (Secure) protocol; 3) SAP: to connect to SAP applications using SAP's Proprietary interfaces; 4) ORA: to connect to Oracle Applications using Oracle's proprietary interfaces; 5) JDE: to connect to JDE (JK Edwards) applications using JDE's proprietary interfaces; 6) I2: to connect to I2 (i2 Technologies) applications using I2's proprietary interfaces; 7) MSFT: to connect to MicroSoft applications using MicroSoft's .Net and other proprietary interfaces; 8) NetERP: to connect to NetSuite ERP using its interface methodologies; 9) SFCOM: to connect to SalesForce.com applications; and 10) MSSQL: to connect to MicroSoft SQL Databases. It should be understood that this list of permissible protocol values can be expanded as required.

"hostname" refers to the hostname of one of back-end systems 106 to be connected. This is typically a www address and is to be used for http protocols, HTTPS protocols, webservices, and so forth.

"port" refers to the port number of the host to be connected. This is typically used in HTTP, HTTPS or web services.

"contextname" refers to the home-page or link that may be executed after connecting to back-end system 106.

"parametername" is the name of the parameter to be passed on to the system. These could be authentication parameters or business application parameters.

"parametervalue" is the value to be passed for the parameter name. These could be either authentication values or business application values for parameters.

Examples of connection parameters 316 are:

```
http://www.hostname.com:50000/contextName?UserId=user1&Password=passvalue&Customer=10023
SAP://?RFCDestination=SEALERP&userid=user1&password=passvalue&Customer=10023
SAP://sealerp.sealconsult.com?SYSNO=00&SYSID=ERP&Userid=user1&Password=Passvalue
MSSQL://?JNDI=JNDIname&userId=user1&password=passvalue
ORA:///AppServername?userid=user1&Password=passvalue
JDE://Appservername?uesrid=user1&Password=passvalue
```

A QUERY tag 606, <QUERY>businesslogic</QUERY> substantially encompasses business logic 314 to extract information content 104 from source applications of back-end systems 106, and to apply filters and business rules to it. Query tag 606 contains all details about input fields, output fields and all the business logic 314 to be applied. Business logic 314 is defined using statements, functions, operators and clauses of XML-based format 602. The details of business logic 314 will be discussed in connection with FIG. 7.

A ROWS tag 608, <ROWS>response</ROWS> is used to capture responses 320 from a source application at one of back-end systems 106, apply business rules, and/or forward response 320 to front-end systems 108. <ROW> </ROW> denotes the row of the output from an application at one of back-end systems 106. <Fieldname>Fieldvalue</Fieldname> denotes the fieldname and value coming from the source application at one of back-end systems 106.

Different parts of request 318 in XML-based format 602 may be generated by different elements within system 102, including mini-applications 122, manager node 124, and/or access node 126. A complete request 318 in XML-based format 602 is not generated nor used by only one element or component of system 102. Rather, the complete request 318 is generated by multiple elements of system 102.

FIG. 7

FIG. 7 shows a chart 700 of business logic 314 used to generate request 320 in XML-based format 602. In particular, chart 700 includes business logic 314 that is used within QUERY tag 606. As mentioned briefly above, business logic 314 is defined using statements 702, functions 704, clauses 706, and operators 708 of XML-based format 602.

Statements 702 are used to specify operations, API for a particular back-end application 425, input & output fields, data manipulation, and so forth. Statements 702 of XML-based format 602 include a SELECT statement, a FROM statement, a WHERE statement, an OPERATION statement, a GROUPBY statement, an ORDERBY statement, a LIMIT statement, a UNION statement, and a CONDITION statement.

The SELECT statement 702 is used to select information content 104 from a particular back-end application 425 within back-end system 106. Output fields 710 would be listed under the SELECT statement 702. This SELECT statement 702 is generated by mini-application 122 when the query data 220 is created. Output fields 710 could be generic fieldnames and need not be specific fieldnames for one of back-end applications 425 of back-end system 106. For example, a fieldname could be named "Customer_No" in an Application-A, and named "Account" in an Application-B, but the mini-application 122 could use a generic field-name called "Customer". Manager node 124 converts generic fieldnames to back-end system 106 specific fieldnames while applying business logic 314. Output fields are separated by a delimiter, such as a comma, for example, "SELECT customer, contact, phone."

The FROM statement 702 is used to specify the API of the source enterprise application at a back-end system 106. FROM statement 702 is generated by manager node 124 and is appended to query data 220 received from front-end system 108 executing mini-application 122, for example, "FROM BAPI_FIND_CUSTOMER_ADDRESS."

The WHERE statement 702 specifies the conditions 712 for data selection. In an embodiment, mini-application 122 executing at front-end system 106 would capture input fields from end-user 114 and generate WHERE statement 702. The input fields could be generic fieldnames and need not be specific fieldnames for one of back-end applications 425 of back-end system 106. For example, a fieldname could be named "ID" in application-A, and could be named "Identifier" in Application B, but the mini-application 122 could use a generic field-name called "Id". Manager node 124 converts generic fieldnames to back-end system 106 specific fieldnames while applying business logic 314, for example, WHERE Id=101.

The OPERATION statement 702 is used to specify the execution operation on back-end application 425. Operation statement 702 desirably takes precedence over SELECT statement 702 when it is executed. In one embodiment, the permissible and valid values for OPERATION statement are "SELECT," "INSERT," "UPDATE," and "DELETE."

SELECT specifies that a SELECT operation is to be executed to extract data. "INSERT" specifies that an INSERT operation is to be executed to insert a new record into back-end application 425. UPDATE specifies that an UPDATE operation is to be executed at back-end application 425. DELETE specifies that a DELETE operation is to be executed at back-end application 425.

These OPERATIONS are executed in conjunction with the SELECT Statement 702 above. As an example, end-user 114 may want to approve a Purchase-Requisition that in turn creates a Purchase-Order in the back-end application 425. The end result for end-user 114 would be to see a Purchase-Order number as a confirmation of Purchase-Requisition Approval. In this case, two operations can be executed in back-end application 425. The first operation is to create a Purchase-Order and the second operation is to extract the purchase order created and display it at display 212 as a confirmation. In this case, the system would execute the OPERATION "INSERT" first to create a purchase order and execute the "SELECT" statement to extract the purchase order as a confirmation for the user, for example, OPERATION INSERT.

The GROUPBY statement 702 groups the output by the fieldname and sums up the result by the same fieldname, for example, GROUPBY customer.

The ORDERBY statement 702 is used to sort the output result by the fieldname. The sorting could be done ascending or descending. Ascending is given by "ASC" and descending is done by "DESC," for example, ORDERBY Customer ASC|DESC.

The LIMIT statement 702 is used to limit the number of records in the output. Information content 104 eventually goes to front-end system 108 executing mini-application 122, and mini-applications 122 typically cannot handle large amounts of data. Accordingly, the LIMIT statement 702 is used to limit the number of records, for example LIMIT 5.

The UNION statement 702 is used to join/combine output results from two disjoint SELECT statements, for example, UNION SELECT fieldname FROM API_name Where Fieldname=Fieldvalue.

The CONDITION statement 702 is used to specify clauses 706. These clauses 706 can be used with other statements 702, for example, CONDITION IF fieldname>fieldvalue THEN SELECT . . . FROM . . . ELSE SELECT . . . FROM . . . .

The EXCEPTIONS statement 702 is used to specify the error handling logic during the generation or execution process.

Functions 704 are specific operations applied to data after extraction from back-end systems 106. Functions are typically used within clauses. Some of functions 704 included in XML-based format 602 are a SUM function, a SUBTRACT function, a COUNT function, an AVERAGE function, a MAX function, and a MIN function.

The SUM function 704 returns a sum of the values included. The syntax is SELECT SUM{{output_field1}, {output_field2}}. The SUBTRACT function 704 subtracts one value from another value. The syntax would be SELECT SUBTRACT {{output_field1}, {output_field2}}. The COUNT function 704 counts and returns the number of rows from the resultset. The syntax would be SELECT COUNT{output_field1}. The AVERAGE function 704 gives an average of the resultset. The syntax would be SELECT AVERAGE{output_field1}. The MAX function 704 returns the maximum value of the resultset. The syntax would be SELECT MAX{output_field1}. The MIN function 704 returns the minimum value of the resultset. The syntax would be SELECT MIN{output_field1}.

Clauses 706 are used to apply conditions and loops. Clauses 706 are either conditional statements or repeating statements that can be applied to statements. Clauses 706 include IF-THEN-ELSE, CASE-WHEN-THEN-ELSE, LOOP-UNTIL, WHILE-LOOP-END, and FOR-LOOP-END.

The IF-THEN-ELSE clause 706 checks a Boolean value or expression and if true, executes the statements in the THEN clause. If the condition is false, the statements in the THEN clause are skipped and statements after the ELSE clause is executed. The expression that is checked must return a true or false. It can be a simple Boolean variable or a compound expression joined with AND/OR clauses.

The CASE-WHEN-THEN-ELSE clause 706 is an extension of IF-THEN-ELSE clause 706 where multiple and complex conditions may have to be checked. It prevents the repetition of IF-THEN-ELSE clauses 706 for complex and repetitive conditions.

The LOOP-UNTIL clause 706 tests a condition at the end of a loop. In other words, it executes the statements at least once before testing the condition and then will keep executing the loop until the condition is satisfied.

In the WHILE-LOOP-END clause 706, the WHILE portion tests a condition at the start of the loop, and it executes the code after the LOOP portion if the condition is true. If the condition is false, the execution never happens.

In the FOR-LOOP-END clause 706, the FOR portion executes the statements after LOOP for the times mentioned in the FOR portion of the clause. It automatically increments a counter and executes the number of times mentioned in the FOR portion.

Operators 708 are used to apply mathematical operators and are typically used within statements 702 or clauses 706 to link two fields. Operators include AND operator, OR operator, BETWEEN operator, IN operator, "=" equal-to operator, ">" greater-than operator, "<" less-than operator, "< >" not-equal-to operator.

The AND operator 708 means both of the conditions are satisfied, for example {Condition-1} and {Condition-2}. The OR operator 708 means either one of the conditions is satisfied, for example, {Condition-1} or {Condition-2}. The BETWEEN operator 708 means the selection is of a field-value between two given values, for example, {Column_name} BETWEEN {Value-1, Value-2}. The IN operator 708 means the selection is for values given after the IN operator 708, for example, {Column_name} IN {Value-1, Value-2}. The "=" operator 708, the ">" operator 708, the "<" operator 708, and the "< >" operator 708 are self-explanatory.

Statements 702 can be used independently or in relation/conjunction with other statements 702. Statements 702 can also be interrelated and depend on one another to build business logic 314. In contrast, functions 704 are always applied to a specific dataset and are not interrelated. Clauses 706 are typically used to apply repeating or conditional logic. Operators 708 are used with clauses 706 or functions 704 to link them. Desirably, statements 702, functions 704, clauses 706, and operators 708 used in QUERY tag 606 are reserve words.

FIG. 8

Figure 8:
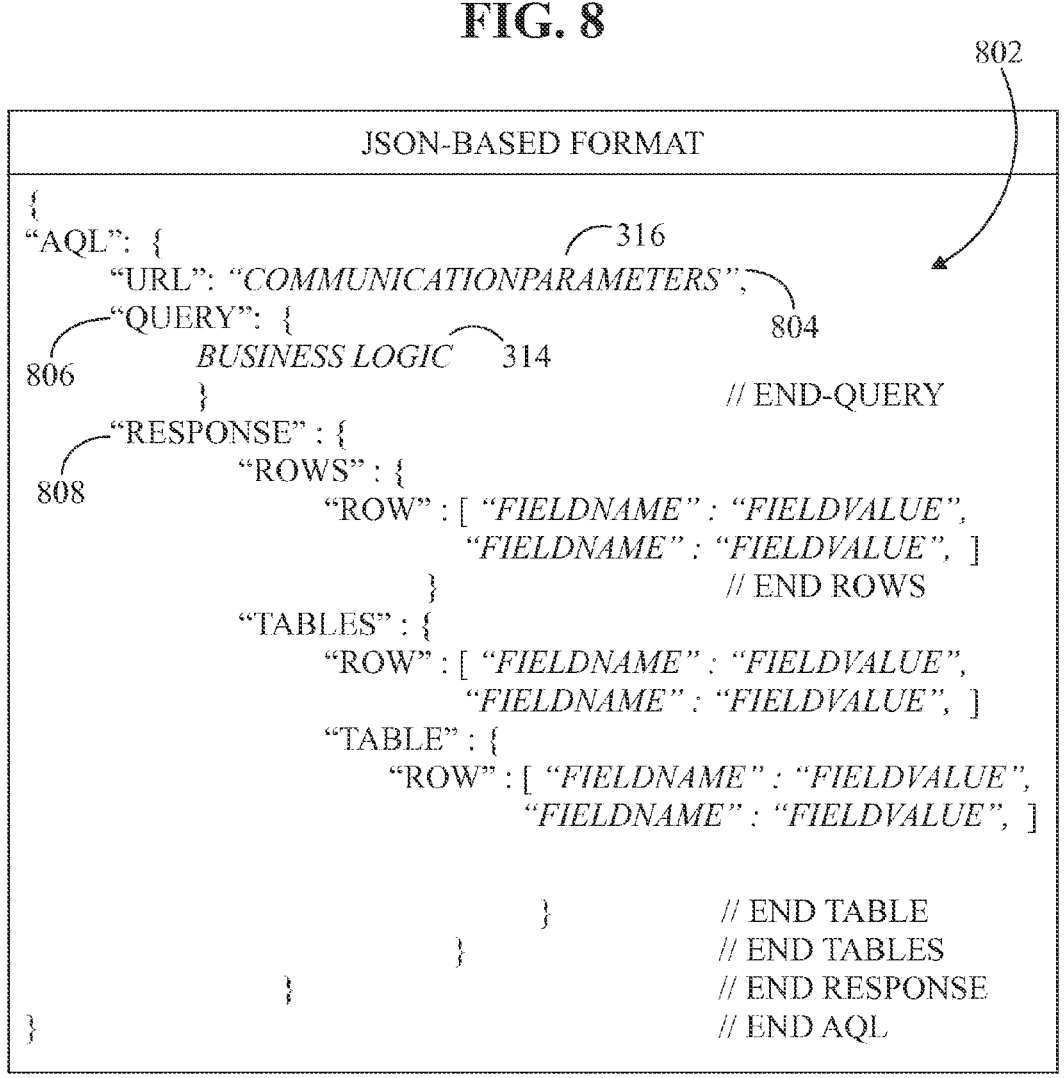
FIG. 8 shows a chart of a JSON-based format used to generate and communicate data within the system of FIG. 1 in accordance with an alternative embodiment.

FIG. 8 shows a chart 800 of JSON-based format 802 used to used to generate and communicate requests 318 and responses 320 between front-end system 108, manager node 124, and access node 126. This embodiment roughly follows a JavaScript Object Notation (JSON) architecture and serves the same purpose of the previously described XML-based format 602. However, JSON-based format 802 is leaner than XML-based format 602 with less tags for transmission. In general, JSON-based format 802 is a text-based file with delimiters and a specific syntax.

JSON-based format 802 is built on two structures. These two structures include a collection of name/value pairs and an ordered list of values. The collection of name/value pairs is realized as an object, record, struct, dictionary, hash table, keyed list, or associative array in various languages. The ordered list of values is realized as an array, vector, list, or sequence in various languages.

Like XML-based format 602, JSON-based format 802 includes a URL tag 804 that provides connection parameters 316 for one of back-end systems 106 and a QUERY tag 806 that substantially encompasses business logic 314 to extract information content 104 from source applications of back-end systems 106, and to apply filters and business rules to it. JSON-based format 802 additionally includes a RESPONSE tag 808 that is used to capture responses 320 from back-end application 425 at one of back-end systems 106, apply business rules, and/or forward response 320 to front-end systems 108.

FIG. 9

FIG. 9 shows a chart 900 of business logic 314 used to generate request 320 in JSON-based format 802. In particular, chart 900 includes business logic 314 that is used within QUERY tag 806. Like XML-based format 602, business logic 314 is defined using statements 902, functions 904, clauses 906, and operators 908 within JSON-based format 802. Statements 902, functions 904, clauses 906, and operators 908 vary little from those presented in connection with XML-based format 602. As such, a description of them will not be repeated herein.

FIGS. 10A-10B

Figure 10A:
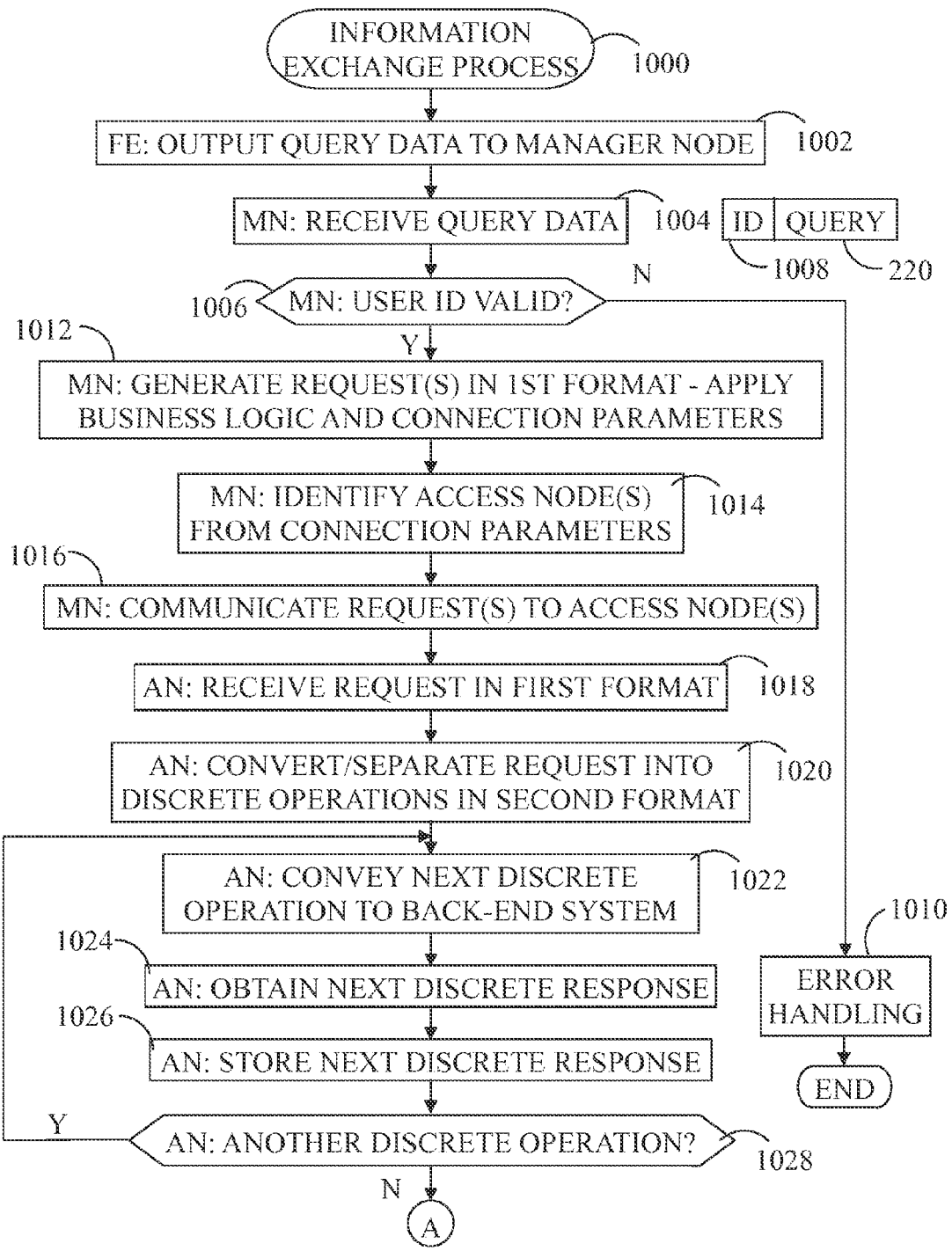

FIGS. 10A and 10B show a flowchart of an information exchange process 1000 executed within system 102. The operations of process 1000 are delineated with a key indicating which element within system 102 is performing a particular operation. In FIGS. 10A and 10B, the abbreviation "FE" represents front-end system 108, the abbreviation "MN" represents manager node 124, and the abbreviation "AN" represents access node 126.

Information exchange process 1000 commences with a task 1002. At task 1002, mini-application 122 is executed at front-end system 108. Mini-application 122 initiates generation of request 318 by outputting query data 220 from front-end system 108 over link 128 to manager node 124. For illustrative purposes, query data 220 is in XML-based format 602 and includes output field(s) 710 and condition(s) 712.

A task 1004 is performed in connection with task 1002. At task 1004, manager node 124 receives query data 220.

Next, manager node 124 validates query data 220 at a query task 1006. Validation may entail verifying a user identifier 1008 and other identification markers associated with query data 220. When manager node 124 determines at query task 1006 that query data 220 and/or user identifier 1008 are invalid process control proceeds to a task 1010. At task 1010, an error handling routine may be initiated to record the invalidated query data 220. Following task 1010, information exchange process 1000 exits.

However, when manager node 124 validates query data 220 and user identifier 1008 at query task 1006, process control proceeds to a task 1012. At task 1012, manager node 124 generates one or more requests 318 in XML-based format 602 and applies business logic 314 and connection parameters 316, as previously discussed.

Information exchange process 1000 continues with a task 1014. At task 1014, manager node 124 identifies the appropriate access node or nodes 126 to which the one or more requests 318 are to be communicated using connection parameters 316 applied to each request 318.

Following task 1014, a task 1016 is performed. At task 1016, manager node 124 communicates the one or more requests 318 to the appropriate access nodes 126 in accordance with connection parameters 316.

In response to task 1016, a task 1018 is performed. At task 1018, access node 126 receives request 318 in XML-based format 602. Task 1016 and subsequent related tasks will discuss operations at a single access node 126 and a single back-end system 106 for simplicity of illustration. It should be understood, however, that manager node 124 may have communicated multiple requests 318 to disparate access nodes 126, all of which are to be processed in order to obtain the requested information content 104.

Following task 1018, process 1000 continues with a task 1020. At task 1020, access node 126 converts request 318 into an API format specific to one of back-end applications 425 to be accessed. Conversion may entail separating request 318 into multiple discrete operations 502, in accordance with an API to be used to access one of back-end applications 425.

In response to task 1020, a task 1022 is performed. At task 1022, access node 126 conveys a next discrete operation 502 to back-end system 106. Of course, during a first iteration of task 1022, the "next" discrete operation 502 will be a first operation 502. Operation 502 is conveyed to back-end system 106 as a query in a format, or language, specific to back-end application 425 to be accessed.

Process 1000 continues with a task 1024. At task 1024, access node 126 obtains a next discrete response 506 in response to operation 502. Again, during a first iteration of task 1024, the "next" discrete response 506 will be a first response 506.

Next, at a task 1026, access node 126 at least temporarily stores response 506.

Information exchange process 1000 continues with a query task 1028. At query task 1028, access node 126 determines whether there is another discrete operation 502 to be executed. When a determination is made that there is another discrete operation 502, program control loops back to task 1022 to convey the next discrete operation 502 to back-end system and obtain the next discrete response 506. However, at query task 1028, when all calls have been made to back-end system 126 and there are no further operations 502, information exchange process 1000 proceeds to a task 1030. Note that process 1000 continues on FIB 10B with task 1030.

At task 1030, access node 126 forms response 320 containing information content 104 from the multiple discrete responses 506. Forming response 320 entails converting the information contained in responses 506 to XML-based format 602.

Next, at a task 1032, access node 126 transfers response 320 to manager node 124 in XML-based format 602.

Process 1000 continues with a task 1034. At task 1034, manager node 124 receives "next" response 320 in XML-based format 602. It should be recalled that manager node 124 may have generated more than one request 318 at task 1012 in order to obtain the desired information content 104. Thus, manager node 124 may be awaiting more than one response 320 from more than one access node 126. Accordingly, during a first iteration of task 1034, the "next" response 320 will be a first response 320.

Upon receipt of response 320 at task 1034, a task 1036 is performed. At task 1036, manager node 124 at least temporarily retains response 320.

Next at a query task 1038, manager node 124 determines whether another response 320 is to be received. Again, manager node 124 may have generated and communicated more than one request 318 to access nodes 126. When receipt of another response 320 is expected, program control loops back to task 1034 to receive and process another response 320. However, when no further responses 320 are expected at query task 1038, process 1000 continues with a task 1040.

At task 1040, manager node 124 filters, combines, or otherwise processes responses 320 to obtain information content 104.

Next at a task 1042, manager node 124 transfers information content 104 in XML-based format 602 to mini-application 122 executing on front-end system 108.

Information exchange process 1000 continues with a task 1044. At task 1044, through the execution of mini-application 122 and implementation of display logic 208, front-end system 108 converts information content 104 to notification 222. Of course, notification 222 can be any display format, such as full screen display, pop-up message, or visual notification, that is considered optimal for the particular front-end system 108 on which it will be displayed.

Next, at a task 1046, information content 122, for example, an event occurring at back-end system 106, is provided to end-user 114 on display 212 as notification 222 of the particular event.

Process 1000 continues with a query task 1048. At query task 1048, a determination is made at front-end system 108 by end-user 114 as to whether the end-user 114 is to disposition, i.e., make some decision, about the event. When end-user 114 need not make some decision about the event, information exchange process 1000 ends for that particular instance of information exchange. Such a situation can arise, when end-user 114 need only be kept informed of certain events taking place within back-end applications 425 of back-end system 124, but need not take action regarding those events.

However, when end-user 114 is to make some decision about the event, process 1000 continues with a task 1050. At task 1050, end-user 114 dispositions the event. In an embodiment, execution of disposition mini-application 218 may be initiated by end-user 114 or by query mini-application 216 to enable the transfer of disposition data back to a particular back-end application 425 within one of back-end systems 124. That is, XML-based and JSON-based formats 602 and 802, respectively, readily accommodate the input of disposition data back to back-end application 425 in order to update information content 104 stored in back-end system 106. Following task 1050, process 100 ends for that particular instance of information exchange.

FIG. 11

Figure 11:
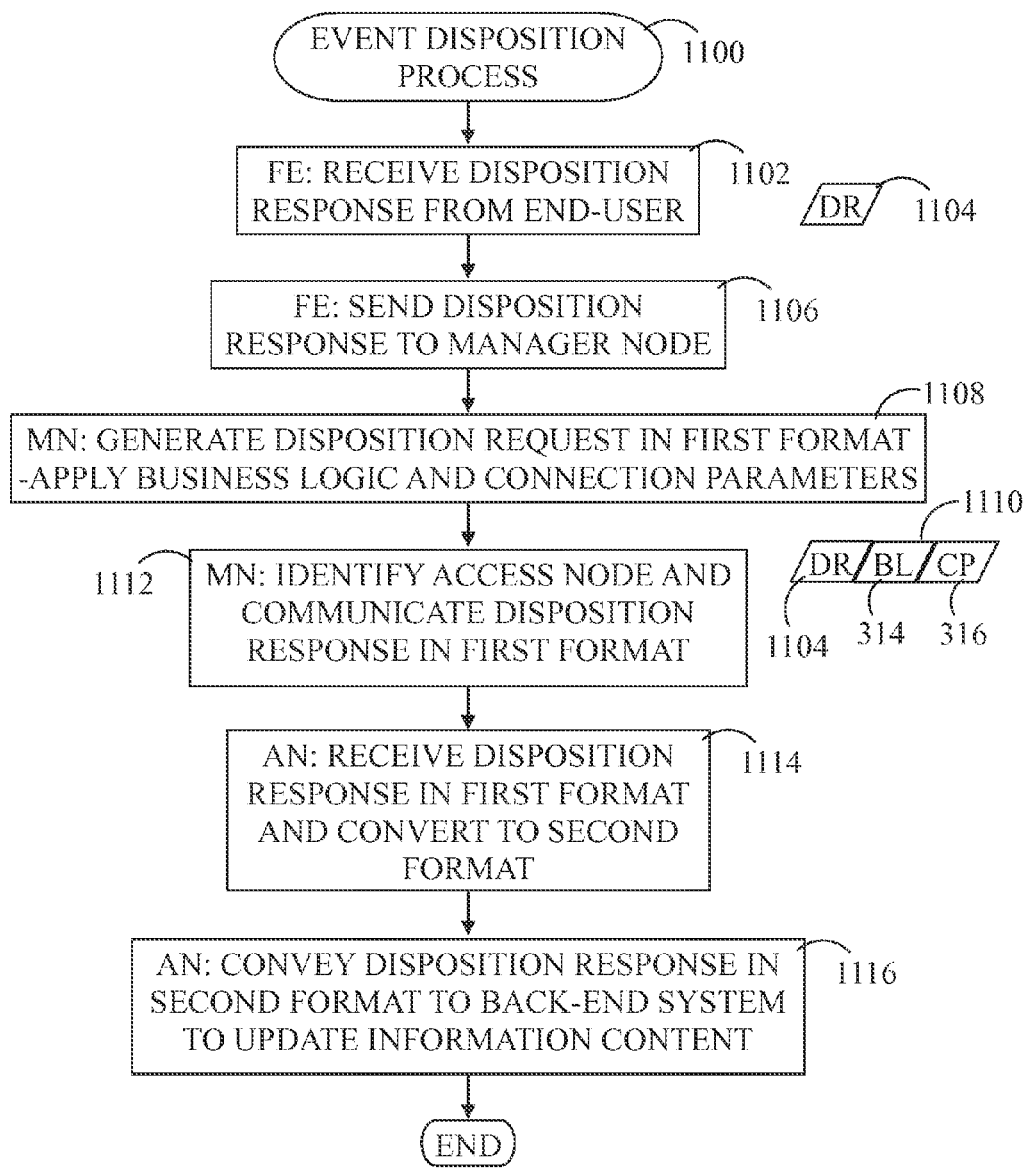
FIG. 11 shows a flowchart of an event disposition process executed within the system of FIG. 1.

FIG. 11 shows a flowchart of an event disposition process 1100 executed within system 102. Event disposition process 1100 may be executed in connection with task 1050 of information content exchange process 1000 so that end-user 114 can disposition, i.e., make some sort of decision about, a particular event occurring at a particular back-end application 425.

Event disposition process 1100 begins with a task 1102. At task 1102, one of mini-applications 122 (e.g., disposition mini-application 218) receives a disposition response (DR) 1104 from end-user 114. In an example, end-user may approve or disapprove a particular purchase order. Although, it should be understood that disposition response 1104 could be any decision required for any possible event envisioned.

Next at a task 1106, disposition response 1104 is sent from front-end system 108 to manager node 124 in a standardized format 500, e.g., XML-based format 602 or JSON-based format 802.

Following task 1108, manager node 124 receives disposition response 1104, processes disposition response 1104 to generate a disposition request 1110 with applied business logic (BL) 314 and connection parameters (CP) 316.

Next, at a task 1112, manager node 124 identifies the appropriate access node 126 from the applied connection parameters 316 and communicates disposition request 1110 containing disposition response 1104 to the identified access node 126 in standardized format 500.

Event disposition process 1100 continues with a task 1114. At task 1114, access node 126 receives disposition request 1110 in standardized format 500. Access node filters, converts, or otherwise processes disposition request 1110 to a different format, e.g., an API that is specific to back-end application 425 within back-end system 106 with which access node 126 is associated.

A task 1116 is performed in connection with task 1114. At task 1116, access node 126 conveys disposition response 1104 to back-end application 425 in the form and format suitable for the particular back-end application 425. Thus, disposition response 1104 can be used at back-end application 425 to update information content 104 associated with back-end application 425. Following task 1116, event disposition process ends for that particular instance of updating information content.

Although not expressly shown, a response 320 from access node 126 to front-end system 108 via manager node 124 may optionally be sent in order to inform end-user 114 of the update to information content 104.

FIG. 12

FIG. 12 shows a flowchart of an exemplary purchase order review process 1200 that may be implemented within system 102. Purchase order review process 1200 is provided to exemplify the various functions and features of an embodiment of the invention, and should not be considered limiting.

Purchase order review process 1200 begins with a task 1202. At task 1202, query data 220 is initiated for current purchase orders in XML-based format 602. Statements 702, in XML-based format 602, to be used include "SELECT" and "WHERE." Query data 220 may be output by front-end system 108 to manager node 124 through execution of one of mini-applications 122. Alternatively, manager node 124 may include some form of a mini-application 122 that periodically provides query data 220.

Next, at a task 1204, manager node 124 applies business logic 314 and connection parameters 316 to query data 220 in order to generate request 318. Statements, in XML-based format 602, to be used include <URL>Connection parameters</URL>, FROM statement 702, LIMIT statement 702, GROUPBY statement 702, and ORDERBY statement 704.

Following generation of request 318 at task 1204, a task 1206 is performed. At task 1206, manager node 124 communicates request 318 to access node 126 in XML-based format 602.

At a task 1208 performed in response to task 1206, access node 126 executes request 318 and extracts response 320 from back-end system in a particular API format 504.

Next at a task 1210, access node 126 converts the extracted response 320 to XML-based format 602.

Process 1200 continues with a task 1212. At task 1212, access node 126 transfers response 320 in XML-based format 602 to manager node 124. Statements, in XML-based format 602, to be used include <ROWS>PURCHASE ORDER(S)</ROWS>.

Next, a task 1214 is performed. At task 1214, manager node filters response 320 to obtain information content 104, namely, PURCHASE ORDER(S).

In response to task 1214, a task 1216 is performed. At task 1216, manager node 124 transfers information content 104, namely PURCHASE ORDER(S) to front-end system 108.

Following task 1216, a task 1218 is performed at front-end system 108. At task 1218, notification 222 of PURCHASE ORDER(S) is displayed on display 212. Following task 1216, process 1200 ends for this particular instance of information exchange.

In summary, the present invention teaches of methodology and a system for facilitating the exchange of information content between a back-end system contained in a restricted access environment and a front-end system outside of the restricted access environment. Embodiments of the invention facilitate the transfer of business data quickly and easily between multiple source enterprise applications of the back-end systems and various front-end systems. Embodiments include mini-applications that execute on any of a variety of front-end systems, a manager node that provides integration, security, usage, and data services between the mini-applications and back-end applications operating on back-end systems via access nodes. The access nodes reside within the restricted access environment and are responsible for communicating with source systems, e.g. the back-end applications operating on the back-end systems. In addition, the access nodes enable access to any business functionality within SAP enterprise systems via the SAP business function enabler. A standardized format, also called an API query language herein, provides a business language for any front-end system, and eliminates the need to store any business data outside the back-end systems. Furthermore, the API query language is "lean" for communications between the front-end systems, manager node, and access node, and enables the receipt of business data in minimal communication traversals. In addition, embodiments of the invention enable continual access to, and ability to update information content at, business applications, thereby improving business productivity.

Although the preferred embodiments of the invention have been illustrated and described in detail, it will be readily apparent to those skilled in the art that various modifications may be made therein without departing from the spirit of the invention or from the scope of the appended claims. For example, the process steps discussed herein can take on great number of variations and can be performed in a differing order then that presented.

What is claimed is:

1. A method of exchanging information content between a back-end system and a front-end system comprising:
    receiving, at a manager node, query data from said front-end system in response to said front-end system executing a mini-application, wherein said mini-application is a light-weight application that performs a specific function operating that is a sub application of an application operating on the front-end system to provide secure access to a back-end system and said manager node is a multi-tenant cloud application;
    generating, at said manager node, a request for said information content in response to receipt of said query data, said request being generated in a first format;
    communicating said request in said first format from said manager node to an access node within a restricted access environment containing said back-end system;
    converting, at said access node, said request for said information content from said first format to a second format supported by said back-end system;
    conveying said request in said second format from said access node to said back-end system;
    obtaining, at said access node, said information content in said second format from said back-end system;
    forming, at said access node, a response in said first format, said response containing said information content;
    sending said information content contained in said response from said access node to said front-end system via said manager node, wherein said manager node provides integration, security, usage and data services between said mini-applications executing on said front-end system and said backend systems via said access node within said restricted access environment;
    converting, at said front-end said system, said response from said first format to a notification that includes said information content;
    displaying said notification at said front-end system, wherein said front-end system is one of a plurality of front-end systems associated with an end-user, and said converting and displaying operations provide said notification in a display format optimized for said one of said plurality of front-end systems and wherein said displaying operation comprises displaying said notification as a pop-up message;
    and wherein said back-end system executes an SAP application, said information content is non-remote enabled data contained within said SAP application, said second format is suitable for communication with a business function enabler of said SAP application, and said conveying operation comprises conveying said request to said business function enabler to extract said non-remote enabled data as said information content for provision to said front-end system.

2. A method as claimed in claim 1 wherein said query data includes at least user identification for an end-user of said front-end system, and said method further comprises:
    determining whether said user identification is valid;
    when said user identification is valid, performing said generating operation;
    and when said user identification is invalid, preventing said generating operation.

3. A method as claimed in claim 1 further comprising periodically performing said generating operation to obtain periodic updates of said information content from said back-end system for said front-end system.

4. A method as claimed in claim 1 wherein said generating operation comprises applying, at said manager node, connection parameters to said request, said connection parameters specifying a network address of said back-end system.

5. A method as claimed in claim 1 wherein said generating operation comprises applying, at said manager node, business logic to said request, said business logic being based upon said query data received from said front-end system, and said business logic specifying a type of said information content to be sent to said front-end system.

6. A method as claimed in claim 1 wherein:
    said converting operation comprises separating said request into a plurality of discrete operations in said second format for execution by said back-end system;

said conveying operation comprises individually conveying each of said plurality of discrete operations to said back-end system;

said obtaining operation comprises at least temporarily retaining a plurality of discrete responses from said back-end system;

and said forming operation comprises processing said plurality of discrete responses to generate said response in said first format.

7. A method as claimed in claim 1 wherein:

said method further comprises transferring said query data in a first transmission event from said front-end system to said manager node;

said communicating operation communicates said request in a second transmission event from said manager node to said access node;

and said sending operation comprises transferring said response in a third transmission event from said access node to said manager node and transferring said information content contained in said response in a fourth transmission event from said manager node to said front-end system.

8. A method as claimed in claim 1 wherein said sending operation comprises:

receiving said response at said manager node from said access node;

filtering said response at said manager node to obtain said information content;

and forwarding said information content to said front-end system.

9. A method as claimed in claim 8 wherein said forwarding operation comprises:

providing display logic from said manager node to said frontend system with said information content;

and displaying a notification at said front-end system in a display format optimized for said front-end system using said display logic, said notification including said information content.

10. A method as claimed in claim 1 wherein said information content sent to said front-end system informs an end-user of an event occurring at said back-end system, and said method further comprises executing an event disposition process at said frontend system in response to said information content, said event disposition process enabling said end-user to disposition said event.

11. A method as claimed in claim 10 wherein:

said executing operation comprises receiving a disposition response at said front-end system from said end-user and sending said disposition response in said first format from said frontend system to said access node via said manager node;

and said method further comprises converting, at said access node, said disposition response from said first format to said second format and conveying said disposition response in said second format from said access node to said back-end system to update said information content.

12. A system for exchanging information content between a back-end system contained in a restricted access environment and an end-user outside of said restricted access environment, said system comprising:

a front-end system directly accessible by said end-user, said front-end system executing more than one mini-application to output query data, wherein said mini-applications are light-weight applications that occupy a small amount of display space and system memory and performs a specific function, wherein said mini-applications are sub applications of an application executed on a front end system;

a manager node in communication with said front-end system for receiving said query data, wherein said manager node is a multi-tenant cloud application and generates a request for said information content in a first format upon receipt of said query data and said manager node outputs said request in said first format, wherein said multi-tenant cloud application is user customizable without deploying a new application including adding new data fields, new data entities, new business logic, application flows, batch data manipulations, and application screens;

an access node within said restricted access environment and in selective communication with each of said manager node and said back-end system, wherein upon communication of said request from said manager node to said access node, said access node converts said request from said first format to a second format supported by said back-end system, conveys said request in said second format to said back-end system, obtains said information content in said second format from said back-end system, forms a response in said first format, said response containing said information content, and sends said information content contained in said response from said access node to said front-end system via said manager node, wherein said manager node provides integration, security, usage and data services between said mini-applications executing on said front-end system and said access node within said restricted access environment;

said front-end system converts said response from said first format to a notification that includes said information content, wherein said front end system displays said notification, wherein said front-end system is one of a plurality of front-end systems associated with an end-user, and said mini-application includes display logic for converting and displaying said notification in a display format optimized for said one of said plurality of front-end systems and wherein said displaying operation comprises displaying said notification as a pop-up message; and wherein said back-end system executes an SAP application, said information content is non-remote enabled data contained within said SAP application, said second format is suitable for communication with a business function enabler of said SAP application, and said conveying operation comprises conveying said request to said business function enabler to extract said non-remote enabled data as said information content for provision to said front-end system.

13. A system as claimed in claim 12 wherein said manager node comprises:

a rules engine for applying connection parameters, said connection parameters specifying a network address of said backend system;

and an access node connector in communication with said rules engine for secure communication of said request to said access node in response to said connection parameters.

14. A system as claimed in claim 13 wherein said back-end system is one of a plurality of back-end systems, and said system further comprises a plurality of access nodes within distinct restricted access environments, one each of said plurality of access nodes being in selective communication with one each of said plurality of back-end systems, wherein said access node connecter is configured to identify said access node from said plurality of access nodes in response to said connection parameters to communicate said request to said identified access node.

15. A system as claimed in claim 12 wherein said manager node comprises a rules engine for applying business logic to said query data to generate said request, said business logic specifying a type of said information content to be sent to said front-end system.

16. A system as claimed in claim 12 wherein said manager node comprises a rules engine for filtering said response received from said access node to obtain said information content, and said manager node forwards said information content to said front-end system.

17. A system as claimed in claim 12 wherein said manager node provides display logic to said front-end system with said information content, and said mini-application utilizes said display logic for converting said information content to a notification that includes said information content and displaying said notification optimized for presentation on said display.

18. A system as claimed in claim 12 wherein said information content informs an end user of an event occurring at said backend system, and said front-end system executes an event disposition process in response to said event to enable said end user to disposition said event.

19. A system as claimed in claim 18 wherein:
said event disposition process enables receipt of a disposition response at said front-end system from said end-user and instructs said front-end system to send said disposition response in said first format to said access node via said manager node; and
said access node converts said disposition response from said first format to said second format and conveys said disposition response in said second format to said back-end system to update said information content at said back-end system.

20. A system as claimed in claim 12 wherein said access node comprises:
a rules engine for separating said request into a plurality of discrete operations;
and a query engine in communication with said rules engine for receiving said plurality of discrete operations, converting said plurality of discrete operations into said second format for execution by said back-end system, conveying each of said plurality of said discrete operations to said back-end system, obtaining a plurality of discrete responses from said back-end system, and processing said plurality of discrete responses to generate said response in said first format.

21. A method of exchanging information content between a back-end system and a front-end system comprising:
receiving, at a manager node, query data from said front-end system in response to said front-end system executing a mini-application that is a sub application of an application operating on the front-end system, wherein said mini-application is a light-weight application that occupies a small amount of display space and system memory and performs a specific function and said manager node is a multi-tenant cloud application;
customizing said multi-tenant cloud application including adding new application screens, data fields, new data entities, by adding new business logic, application flows, batch data manipulations, and application screens in said multi-tenant cloud application, without deploying a new multi-tenant cloud application;
generating, at said manager node, a request for said information content in response to receipt of said query data, said request being generated in a first format;
communicating said request in said first format from said manager node to an access node within a restricted access environment containing said back-end system;
converting, at said access node, said request for said information content from said first format to a second format supported by said back-end system;
conveying said request in said second format from said access node to said back-end system;
obtaining, at said access node, said information content in said second format from said back-end system;
forming, at said access node, a response in said first format, said response containing said information content;
sending said information content contained in said response from said access node to said front-end system via said manager node, said sending operation including receiving said response at said manager node from said access node, filtering said response at said manager node to obtain said information content, and forwarding said information content to said front-end system, wherein said manager node provides integration, security, usage and data services between said mini-applications executing on said front-end system and said access node within said restricted access environment;
and converting, at said front-end said system, said information content to a notification that includes said information content;
displaying said notification at said front-end system, wherein said front-end system is one of a plurality of front-end systems associated with an end-user, and said converting and displaying operations provide said notification in a display format optimized for said one of said plurality of front-end systems and wherein said displaying operation comprises displaying said notification as a pop-up message;
wherein said back-end system executes an SAP application, said information content is non-remote enabled data contained within said SAP application, said second format is suitable for communication with a business function enabler of said SAP application, and said conveying operation comprises conveying said request to said business function enabler to extract said non-remote enabled data as said information content for provision to said front-end system.

22. A method as claimed in claim 21 wherein:
said method further comprises transferring said query data in a first transmission event from said front-end system to said manager node;
said communicating operation communicates said request in a second transmission event from said manager node to said access node; and
said sending operation comprises transferring said response in a third transmission event from said access node to said manager node, and transferring said information content contained in said response in a fourth transmission event from said manager node to said front-end system.

23. A method as claimed in claim 21 wherein said generating operation comprises applying, at said manager node, connection parameters to said request, said connection parameters specifying a network address of said back-end system.

24. A method as claimed in claim 21 wherein said generating operation comprises applying, at said manager node, business logic to said request, said business logic being based upon said query data received from said front-end system, and said business logic specifying a type of said information content to be sent to said front-end system.

25. A method as claimed in claim 21 wherein:
said converting operation comprises separating said request into a plurality of discrete operations in said second format for execution by said back-end system;
said conveying operation comprises individually conveying each of said plurality of discrete operations to said back-end system;
said obtaining operation comprises at least temporarily retaining a plurality of discrete responses from said back-end system; and
said forming operation comprises processing said plurality of discrete responses to generate said response in said first format.

26. A method of exchanging information content between a back-end system and a front-end system comprising:
receiving, at a manager node, query data from said front-end system in response to said front-end system executing a mini-application that is a sub application of an application operating on the front-end system, wherein said mini-application is a light-weight application that occupies a small amount of display space and system memory and performs a specific function and said manager node is a multi-tenant cloud application;
customizing said multi-tenant cloud application including adding new data fields, new data entities, new business logic, application flows, batch data manipulations, and application screens, without deploying a new multi-tenant cloud application;
generating, at said manager node, a request for said information content in response to receipt of said query data, said request being generated in a first format, said generating operation including applying connection parameters and business logic to said request, said connection parameters specifying a network address of said back-end system, and said business logic specifying a type of said information content to be sent to said front-end system;
communicating said request in said first format from said manager node to an access node within a restricted access environment containing said back-end system in response to said connection parameters;
converting, at said access node, said request for said information content from said first format to a second format supported by said back-end system;
conveying said request in said second format from said access node to said back-end system;
obtaining, at said access node, said information content in said second format from said back-end system;
forming, at said access node, a response in said first format, said response containing said information content; and
sending said information content contained in said response from said access node to said front-end system via said manager node, wherein said manager node provides integration, security, usage and data services between said mini-applications executing on said front-end system and said access node within said restricted access environment;
converting, at said front-end said system, said information content to a notification that includes said information content;
displaying said notification at said front-end system, wherein said front-end system is one of a plurality of front-end systems associated with an end-user, and said converting and displaying operations provide said notification in a display format optimized for said one of said plurality of front-end systems and wherein said displaying operation comprises displaying said notification as a pop-up message; and
wherein said back-end system executes an SAP application, said information content is non-remote enabled data contained within said SAP application, said second format is suitable for communication with a business function enabler of said SAP application, and said conveying operation comprises conveying said request to said business function enabler to extract said non-remote enabled data as said information content for provision to said front-end system.

27. A method as claimed in claim 26 wherein said sending operation comprises:
receiving said response at said manager node from said access node;
filtering said response at said manager node to obtain said information content;
and forwarding said information content to said front-end system.

28. A method as claimed in claim 26 wherein said information content sent to said front-end system informs an end-user of an event occurring at said back-end system, and said method further comprises executing an event disposition process at said frontend system in response to said information content, said event disposition process enabling said end-user to disposition said event.

29. A method as claimed in claim 28 wherein:
said executing operation comprises receiving a disposition response at said front-end system from said end-user and sending said disposition response in said first format from said frontend system to said manager node;
applying, at said manager node, said connection parameters to said disposition response specifying said network address of said back-end system;
sending said disposition response in said first format to said back-end system in response to said connection parameters;
converting, at said access node, said disposition response from said first format to said second format; and
conveying said disposition response in said second format from said access node to said back-end system to update said information content.

* * * * *